US011249557B2

(12) United States Patent
Zhou et al.

(10) Patent No.: US 11,249,557 B2
(45) Date of Patent: Feb. 15, 2022

(54) METHODS AND SYSTEMS FOR CONTROLLING A DEVICE USING HAND GESTURES IN MULTI-USER ENVIRONMENT

(71) Applicants: Wei Zhou, Richmond Hill (CA); Mona Hosseinkhani Loorak, Markham (CA); Gaganpreet Singh, Markham (CA); Xiu Yi, Thornhill (CA); Juwei Lu, North York (CA); Wei Li, Markham (CA)

(72) Inventors: Wei Zhou, Richmond Hill (CA); Mona Hosseinkhani Loorak, Markham (CA); Gaganpreet Singh, Markham (CA); Xiu Yi, Thornhill (CA); Juwei Lu, North York (CA); Wei Li, Markham (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 17/308,408

(22) Filed: May 5, 2021

(65) Prior Publication Data
US 2021/0294427 A1 Sep. 23, 2021

Related U.S. Application Data

(63) Continuation of application No. 16/842,717, filed on Apr. 7, 2020, now Pat. No. 11,112,875.

(30) Foreign Application Priority Data

Mar. 20, 2020 (WO) ................ PCT/CN2020080416
Mar. 23, 2020 (WO) ................ PCTCN2020080562

(51) Int. Cl.
  *G06F 3/01* (2006.01)

(52) U.S. Cl.
  CPC .................... *G06F 3/017* (2013.01)

(58) Field of Classification Search
  CPC ................. G06F 3/011; G06F 3/017
  See application file for complete search history.

(56) References Cited

U.S. PATENT DOCUMENTS

2010/0281436 A1* 11/2010 Kipman ............... A63F 13/42
  715/863
2010/0281437 A1* 11/2010 Stone-Perez ........ A63F 13/843
  715/863

(Continued)

FOREIGN PATENT DOCUMENTS

WO   WO-2014194148 A2 * 12/2014 ......... G06K 9/00355

OTHER PUBLICATIONS

He, Kaiming, et al. "Deep residual learning for image recognition." Proceedings of the IEEE conference on computer vision and pattern recognition. 2016.

(Continued)

Primary Examiner — Michael Pervan

(57) ABSTRACT

Methods and apparatus for gesture-based control of a device in a multi-user environment are described. The methods prioritize users or gestures based on a predetermined priority ruleset. A first-user-in-time ruleset prioritizes gestures based on when in time they were begun by a user in the camera FOV. An action-hierarchy ruleset prioritizes gestures based on the actions they correspond to, and the relative positions of those actions within an action hierarchy. A designated-master-user ruleset prioritizes gestures performed by an explicitly designated master user. Methods for designating a new master user and for providing gesture-control-related user feedback in a multi-user environment are also described.

20 Claims, 25 Drawing Sheets

(56) References Cited

U.S. PATENT DOCUMENTS

| | | | | |
|---|---|---|---|---|
| 2011/0119640 | A1* | 5/2011 | Berkes | G06F 3/017 715/863 |
| 2013/0201104 | A1* | 8/2013 | Ptucha | G06F 3/017 345/158 |
| 2013/0201105 | A1* | 8/2013 | Ptucha | G06F 3/017 345/158 |
| 2018/0284901 | A1* | 10/2018 | Brunner | G06F 3/011 |
| 2020/0293807 | A1 | 9/2020 | Ghobadzadeh et al. | |

OTHER PUBLICATIONS

Redmon, Joseph, and Ali Farhadi. "Yolov3: An incremental improvement." arXiv preprint arXiv: 1804.02767, 2018.

Sandler, Mark, et al. "Mobilenetv2: Inverted residuals and linear bottlenecks." Proceedings of the IEEE Conference on Computer Vision and Pattern Recognition. 2018.

Liu, Wei, et al. "Ssd: Single shot multibox detector." European conference on computer vision. Springer, Cham, 2016.

B. D. Lucas and T. Kanade, An iterative image registration technique with an application to stereo vision. Proceedings of Imaging Understanding Workshop, 1981.

Howard, Andrew G., et al. "Mobilenets: Efficient convolutional neural networks for mobile vision applications." arXiv preprint arXiv:1704.04861, 2017.

Verweij, D. et al., "Multi-User Motion Matching Interaction for Interactive Television Using Smartwatches", TVX 2017.

Clarke, C. et al., "MatchPoint: Spontaneous Spatial Coupling of Body Movement for Touchless Pointing", UIST 2017.

Plaumann, K. et al., "Who has the Force? Solving Conflicts for Multi User Mid-Air Gestures for TVs", TVX 2016.

McGill, M., et al. "How to Lose Friends & Alienate People: Sharing Control of a Single-User TV System", TVX 2014.

Carter, M., et al., "PathSync: Multi-User Gestural Interaction with Touchless Rhythmic Path Mimicry", CHI 2016.

Unpublished International Patent Application No. PCT/CN2020/080416 filed Mar. 20, 2020 in the name of Huawei Technologies Co., Ltd.

Unpublished International Patent Application No. PCT/CN2020/080562 filed Mar. 23, 2020 in the name of Huawei Technologies Co., Ltd.

\* cited by examiner

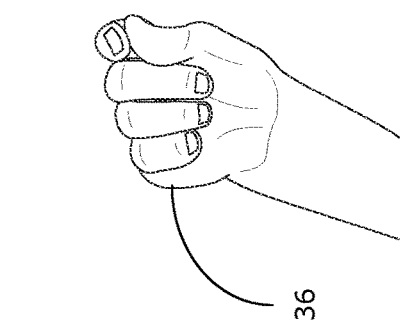
FIG. 3A
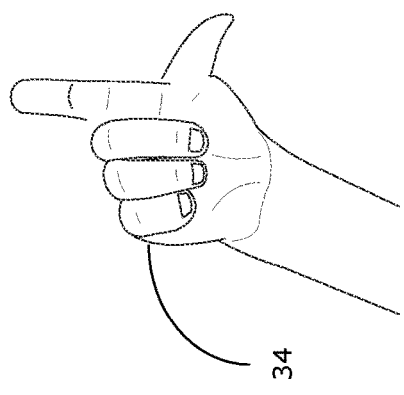
FIG. 3B
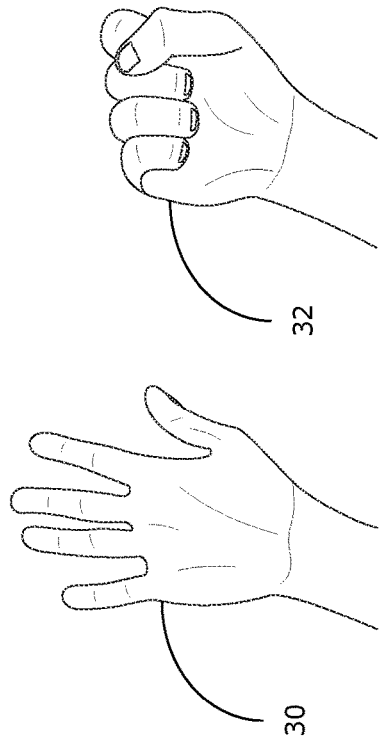
FIG. 3C
FIG. 3D
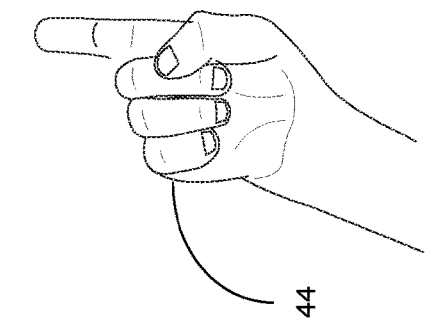
FIG. 3E
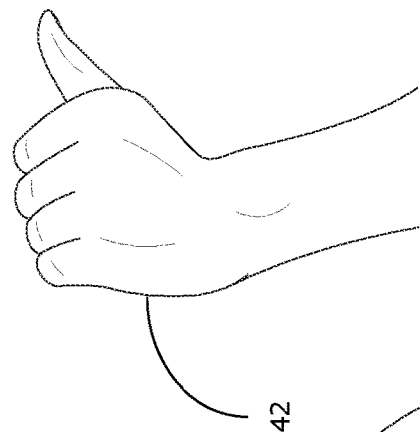
FIG. 3F
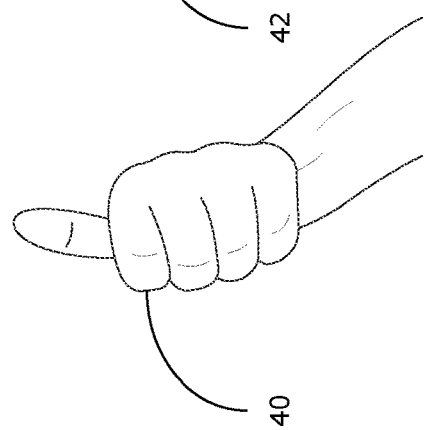
FIG. 3G
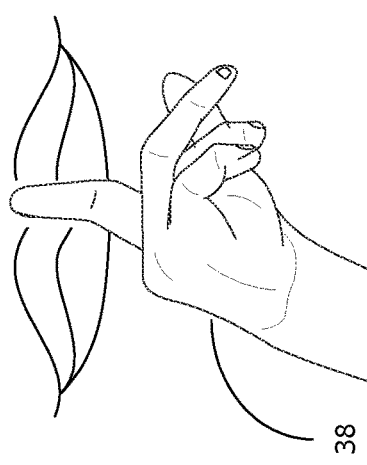
FIG. 3H

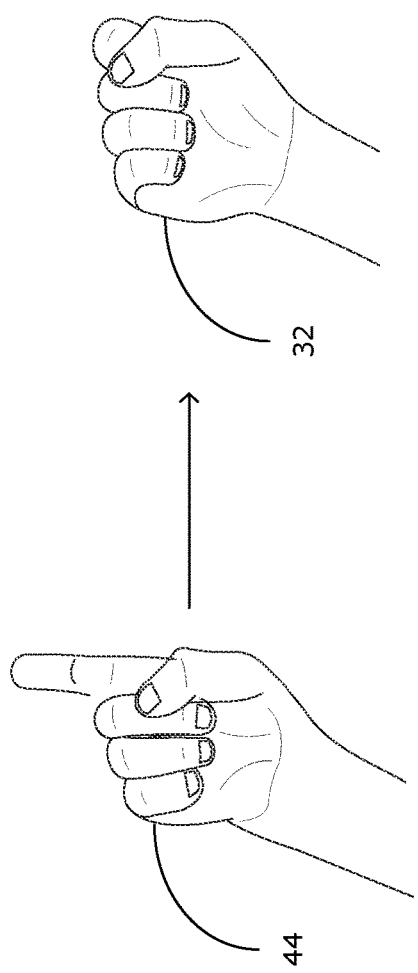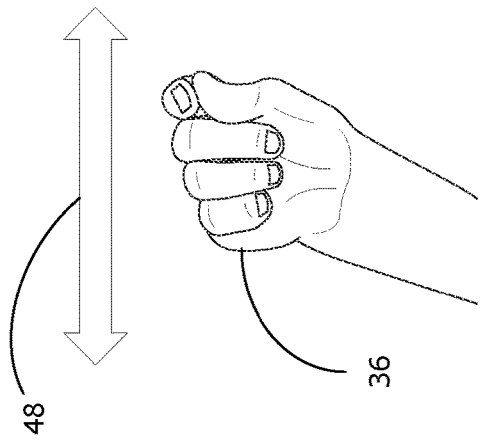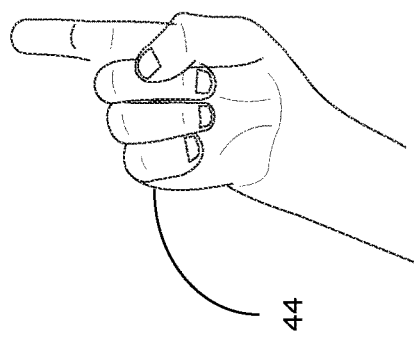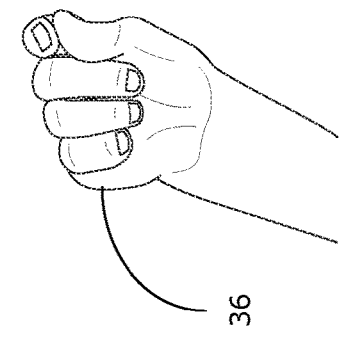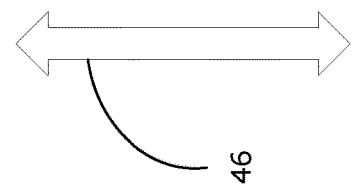
FIG. 4A
FIG. 4B
FIG. 4C

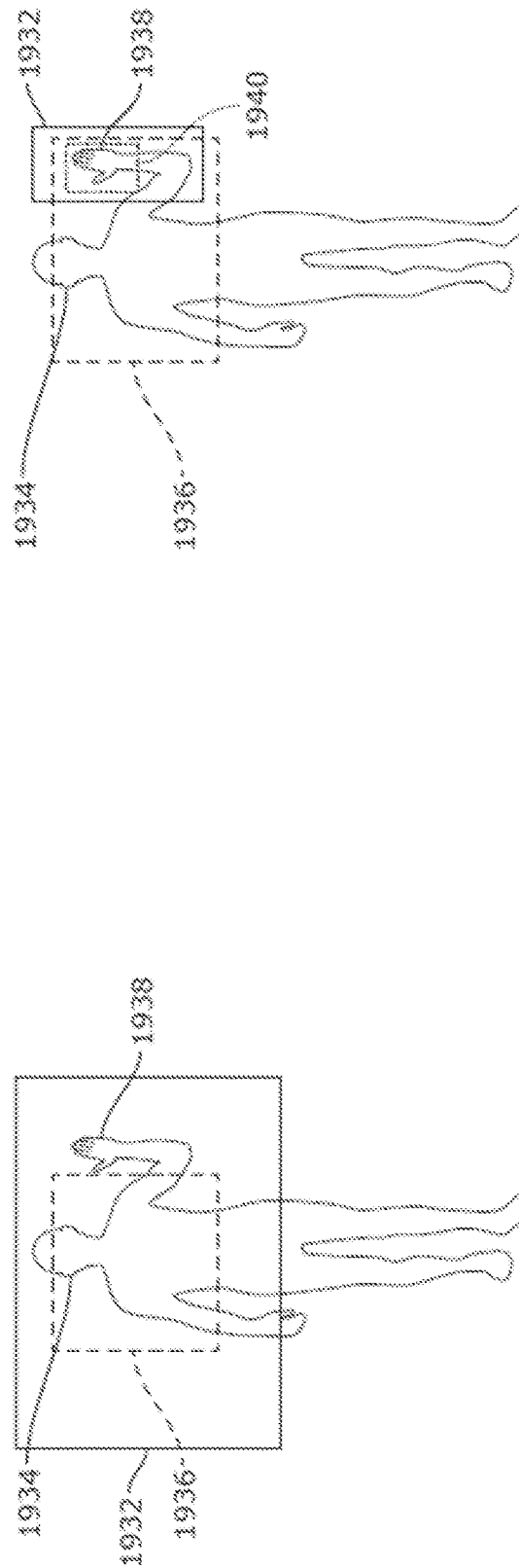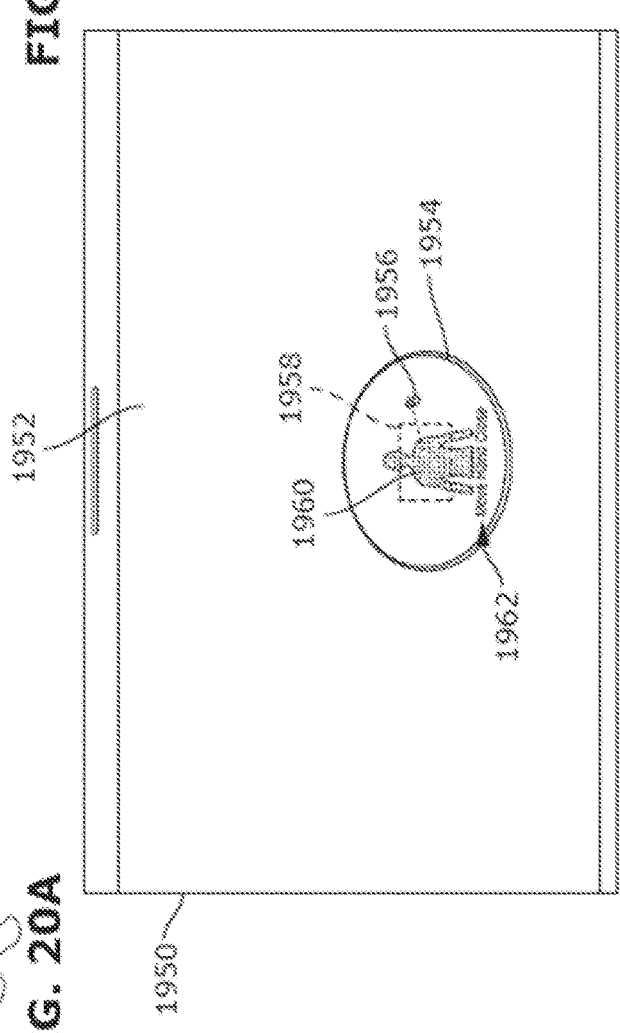

METHODS AND SYSTEMS FOR CONTROLLING A DEVICE USING HAND GESTURES IN MULTI-USER ENVIRONMENT

RELATED APPLICATION DATA

The present application is a continuation of U.S. patent application Ser. No. 16/842,717, filed Apr. 7, 2020, which claims priority to international application no. PCT/CN2020/080416 filed Mar. 20, 2020, and to international application no. PCT/CN2020/080562 filed Mar. 23, 2020, the entire contents of both of which are incorporated herein by reference.

FIELD

The present disclosure relates to methods and systems for controlling a device, such as a television, using hand gestures in a multi-user environment.

BACKGROUND

Remote control of a device shared by a group of users (e.g., a videoconferencing system, television, video gaming system, etc.) using hand gestures has been of interest to facilitate control of the device. However, difficulties arise in multi-user environments when a gesture recognition system is potentially confronted with processing digital images (e.g. frames) in which hand gestures are being performed by more than one user. Gesture recognition systems may require more computing resources for recognizing hand gestures in digital images that include multiple users rather than a single user, and may result in confusion in recognizing hand gestures performed by multiple users. In addition, a gesture recognition system may need to choose which hand gesture or hand gestures to act upon in cases when multiple hand gestures are simultaneously recognized.

Accordingly, it would be useful to provide improved methods and systems techniques for gesture control of a device in a multi-user environment that make efficient use of computing resources, minimize confusion, and resolve interactions between hand gestures performed by more than one user.

SUMMARY

In various examples, the present disclosure describes methods and systems for controlling a device using hand gestures in a multi-user environment. The disclosed methods and system enable real-time interaction between the device (referred to hereinafter as a gesture-controlled device) and two or more users performing mid-air hand gestures. The methods and systems of the present disclosure perform hand gesture recognition to recognize hand gestures performed by multiple users and control the gesture-controlled device based on a priority assigned to the recognized hand gestures.

In some examples, the present disclosure describes a method for controlling a device using hand gestures in a multi-user environment. The method includes receiving a frame of a video, processing at least a portion of the frame to detect a first user visible at a first location in the frame, processing at least a portion of the frame to detect a second user visible at a second location in the frame, using a virtual gesture-space generation subsystem to define a first virtual gesture-space corresponding to a first region of the frame proximal to the first location, processing the first region of the frame using a gesture recognition subsystem to recognize a first hand gesture and generate a label indicative of a gesture class for the recognized first hand gesture, applying a priority ruleset to determine that the first hand gesture has priority, and in response to determining that the first hand gesture has priority, initiating a first action of a computer corresponding to the first hand gesture.

In some examples, the present disclosure describes an apparatus for controlling a device using hand gestures in a multi-user environment. The apparatus includes a processing device coupled to a memory storing machine-executable instructions thereon. The instructions, when executed by the processing device, cause the apparatus to receive a frame of a video, process at least a portion of the frame to detect a first user visible at a first location in the frame, detect a second user visible at a second location in the frame, use a virtual gesture-space generation subsystem to define a first virtual gesture-space corresponding to a first region of the frame proximal to the first location, process the first region using a gesture recognition subsystem to recognize a first hand gesture and generate a label indicative of a gesture class for the recognized first hand gesture, apply a priority ruleset to determine that the first hand gesture has priority, and in response to determining that the first hand gesture has priority, initiate a first action of the apparatus corresponding to the first hand gesture.

In the above example, the apparatus includes at least one camera for capturing the plurality of video frames, and a display for providing feedback information to the first user and second user.

In any of the above examples, the method further comprises providing feedback information to an output device for presentation to the first user, the feedback information indicating that the first hand gesture has priority.

In any of the above examples, the method further comprises using the virtual gesture-space generation subsystem to define a second virtual gesture-space corresponding to a second region of the frame proximal to the second location, and processing the second region using the gesture recognition subsystem, wherein the priority ruleset is a first-user-in-time ruleset that determines that the first hand gesture has priority because the gesture recognition subsystem does not recognize a hand gesture within the second region.

In any of the above examples, the method further comprises receiving a subsequent frame of the video, processing at least a portion of the subsequent frame to detect the first user visible at a first location in the subsequent frame, using the virtual gesture-space generation subsystem to define a subsequent virtual gesture-space corresponding to a first region of the subsequent frame proximal to the first location in the subsequent frame, and processing only the first region of the subsequent frame using the gesture recognition subsystem.

In any of the above examples, the method further comprises providing feedback information to an output device for presentation to the first user, the feedback information indicating that the first hand gesture has priority, and wherein the computer is one of a television, a videoconferencing system, a video gaming system, a vehicle-coupled device, an internet of things device, an augmented reality device, or a virtual reality device.

In any of the above examples, the method further comprises using the virtual gesture-space generation subsystem to define a second virtual gesture-space corresponding to a second region of the frame proximal to the second location, and processing the second region using the gesture recognition subsystem to recognize a second hand gesture and generate a label indicative of a gesture class for the recognized second hand gesture, the second hand gesture corresponding to a second action of the computer, wherein the priority ruleset is an action-hierarchy ruleset that determines that the first hand gesture has priority because the first action is higher in an action hierarchy of the action-hierarchy ruleset than the second action.

In any of the above examples, the method further comprises applying the priority ruleset to determine that the first action is not in conflict with the second action, and in response to determining that the first action and second action are not in conflict, initiating the second action.

In any of the above examples, the action hierarchy includes one or more of the following actions increase audio volume, decrease audio volume, mute audio, and power off.

In any of the above examples, the method further comprises providing feedback information to an output device for presentation to the first user, the feedback information indicating that the first hand gesture has priority, and wherein the computer is one of a television, a videoconferencing system, a video gaming system, a vehicle-coupled device, an internet of things device, an augmented reality device, or a virtual reality device.

In any of the above examples, the method further comprises providing feedback information to an output device for presentation to the first user, the feedback information indicating that the first hand gesture has priority, wherein the computer is one of a television, a videoconferencing system, a video gaming system, a vehicle-coupled device, an internet of things device, an augmented reality device, or a virtual reality device, and the action hierarchy includes one or more of the following actions: increase audio volume, decrease audio volume, mute audio, and power off.

In any of the above examples, the priority ruleset is a designated-master-user ruleset that determines that the first hand gesture has priority because the first user has been designated as a master user.

In any of the above examples, the first action is an action to designate a new master user. The method further comprises, after initiating the first action, providing new master user selection information to an output device for presentation to the first user, the new master user selection information identifying one or more options for designating a new master user, each option corresponding to a user visible in the frame; receiving a subsequent frame of the video; processing at least a portion of the subsequent frame to detect the first user visible at a first location in the subsequent frame; using the virtual gesture-space generation subsystem to define a subsequent virtual gesture-space corresponding to a first region of the subsequent frame proximal to the first location in the subsequent frame; processing the first region of the subsequent frame using the gesture recognition subsystem to recognize a further hand gesture and generate a label indicative of a gesture class for the recognized further hand gesture, the further gesture corresponding to the designation of a first option of the one or more options for designating a new master user; and designating a user corresponding to the first option as the master user.

In any of the above examples, the method further comprises receiving a subsequent frame of the video, processing at least a portion of the subsequent frame to detect the first user visible at a first location in the subsequent frame, using the virtual gesture-space generation subsystem to define a subsequent virtual gesture-space corresponding to a first region of the subsequent frame proximal to the first location in the subsequent frame, and processing only the first region of the subsequent frame using the gesture recognition subsystem.

In any of the above examples, the method further comprises receiving a subsequent frame of the video, processing at least a portion of the subsequent frame to detect the first user visible at a first location in the subsequent frame, using the virtual gesture-space generation subsystem to define a subsequent virtual gesture-space corresponding to a first region of the subsequent frame proximal to the first location in the subsequent frame, processing only the first region of the subsequent frame using the gesture recognition subsystem, and providing feedback information to an output device for presentation to the first user, the feedback information indicating that the first hand gesture has priority, and wherein the computer is one of a television, a videoconferencing system, a video gaming system, a vehicle-coupled device, an internet of things device, an augmented reality device, or a virtual reality device.

In some examples, the present disclosure describes a computer-readable medium having machine-executable instructions stored thereon. The instructions, when executed by a processing device of an apparatus, cause the apparatus to perform any of the methods described above.

The examples disclosed herein may enable more efficient and clearer management of multiple simultaneous gestures performed in a multi-user environment. By providing clear rulesets for prioritizing one simultaneous gesture over others, computing resources can be focused on tracking and recognizing gestures by a single user. Feedback may be provided to users identifying the prioritized gesture or the user performing the prioritized gesture, thereby providing clarity to other users performing gestures. Potentially conflicting simultaneous gestures may have the conflict resolved in a systematic and clear way, preventing user confusion and providing consistent user interface behavior.

BRIEF DESCRIPTION OF THE DRAWINGS

Reference will now be made, by way of example, to the accompanying drawings which show example embodiments of the present application, and in which:

FIGS. 3A-3H illustrate some example gesture classes that may be detected and recognized by an example gesture-controlled device;

FIGS. 4A-4C illustrate some example dynamic gestures that may be detected and recognized by an example gesture-controlled device;

FIG. 20A is a simplified representation of a virtual gesture-space and activation region defined relative to a user;

FIG. 20B is a simplified representation of a virtual gesture-space, hand bounding box and activation region defined relative to a user;

FIG. 20C is an example screen of a display of an example gesture-controlled device showing feedback prompting a user to move a gesture into an activation region;

Similar reference numerals may have been used in different figures to denote similar components.

DESCRIPTION OF EXAMPLE EMBODIMENTS

In various examples, the present disclosure describes methods and systems for controlling of a gesture-controlled device using hand gestures in a multi-user environment. A gesture-controlled device may be a television (e.g., smart TV), a desktop device, a videoconferencing system, a video gaming system, a vehicle-coupled device (e.g., a dashboard device), or a smart speaker, among other possibilities. The methods and systems described herein may be used to enable user interaction with any user interface provided by the gesture-controlled device, including user interfaces rendered on a display device of gesture-controlled device, user interfaces rendered on a display device in communication with the gesture-controlled device. Examples of the methods and systems of the present disclosure may also be implemented for augmented reality (AR) or virtual reality (VR) applications, among other possibilities.

For simplicity, the present disclosure describes examples in the context of a gesture-controlled device having a display (e.g., a smart television (TV) or a display device in communication with a videoconferencing system), and describes methods and systems for controlling the device for interacting with the device, for example for playback of a video. However, it should be understood that the present disclosure is not limited to such embodiments, and the methods and systems described herein may be used for controlling of a variety of gesture-controlled devices in a variety of applications. For example, some embodiments of the methods and system described herein may use other output devices, such as an audio speaker, to provide feedback information to users. Some embodiments may enable users to use hand gestures to interact with other types of content or other software applications, such as a music player, a videoconferencing application, a video game, or a multi-user virtual reality (VR) or augmented reality (AR) environment, among other possibilities.

The use of hand gestures for controlling gesture-controlled device may have advantages over other input modalities for controlling such devices. Using hand gestures to control such devices does not require users to hold such devices for interaction therewith. Furthermore, using hand gesture for controlling such devices may be more hygienic, as users are not required to touch a surface of the gesture-controlled device to interact therewith.

Figure 1:
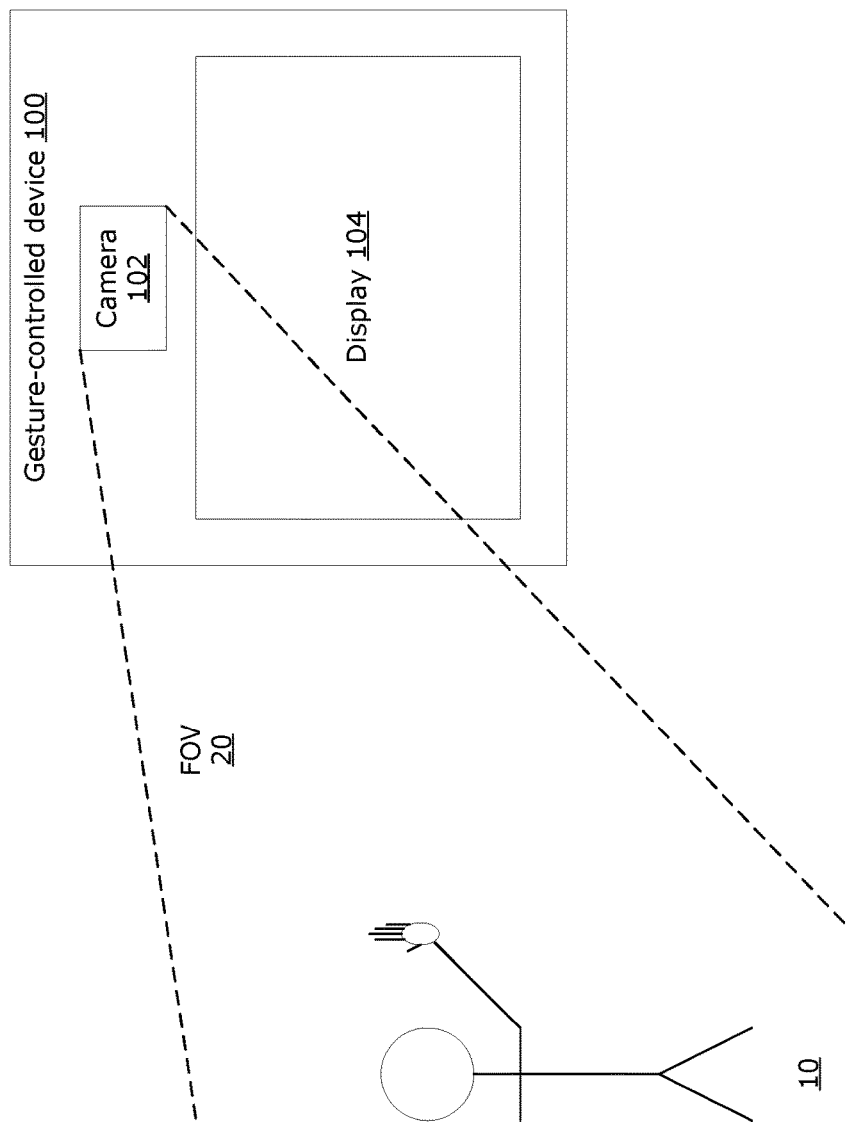
FIG. 1 is a block diagram illustrating a user interacting with an example gesture-controlled device.
Figure 2:
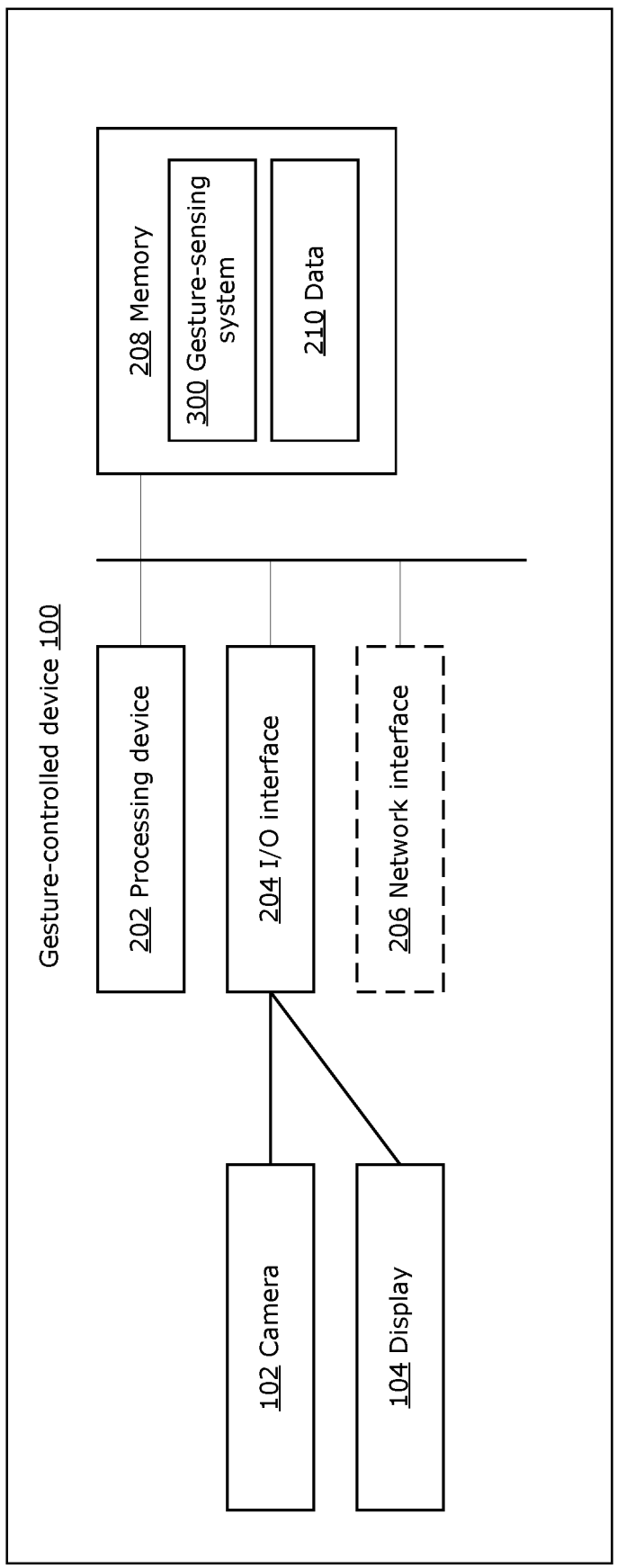
FIG. 2 is a block diagram illustrating some components of an example gesture-controlled device.

FIG. 1 shows an example of a user 10 interacting with a gesture-controlled device 100. In this simplified diagram, the gesture-controlled device 100 includes a camera 102 that captures a field-of-view (FOV) 20. The FOV 20 may include at least a portion of the user 10, in particular a face and a hand of the user 10, as discussed further below. Notably, the FOV 20 in real-life use (e.g., outside of a laboratory setting) typically includes more than just the user 10. For example, the FOV 20 may also include other objects, a background scene, or possible other humans. The gesture-controlled device 100 may, instead of the camera 102, have another sensor capable of sensing hand gestures from the user 10, for example any image capturing device/sensor (e.g., an infrared image sensor). The gesture-controlled device 100 also includes a display device 104 (hereinafter referred to as display 104) for rendering visual information thereon, such as a video. FIG. 2 is a block diagram showing some components of a gesture-controlled device 100. Although an example embodiment of the gesture-controlled device 100 are shown and discussed below, other embodiments may be used to implement examples disclosed herein, which may include components different from those shown. Although FIG. 2 shows a single instance of each component, there may be multiple instances of each component shown.

The gesture-controlled device 100 includes one or more processing devices 202, such as a processor, a microprocessor, an application-specific integrated circuit (ASIC), a field-programmable gate array (FPGA), a dedicated logic circuitry, a dedicated artificial intelligence processor unit, or combinations thereof. The gesture-controlled device 100 also includes one or more input/output (I/O) interfaces 204, which interfaces input devices such as the camera 102 and output devices such as the display 104. The gesture-controlled device 100 may include other input devices (e.g., buttons, microphone, touchscreen, keyboard, etc.) and other output devices (e.g., speaker, vibration unit, etc.). The camera 102 (or other input device) may have capabilities for capturing live gesture input as a sequence of video frames. The captured frames may be buffered by the I/O interface(s) 204 and provided to the processing device(s) 202 to be processed in real-time or near real-time (e.g., within 10 ms).

The gesture-controlled device 100 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The gesture-controlled device 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processing device(s) 202, such as to carry out examples described in the present disclosure. For example, the memory(ies) 208 may include instructions for executing a adaptive gesture-sensing system 300. The memory(ies) 208 may include other software instructions, such as for implementing an operating system and other applications/functions. The memory(ies) 208 may also include data 210, such as video content files that may be presented to users via the display 104.

In some examples, the gesture-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 100 may communicate with each other via a bus, for example.

In some embodiments, a distributed system may include multiple gesture-controlled devices 100 as well as optionally one or more additional components. The distributed system may include multiple gesture-controlled devices 100 in communication with each other over a network; for example, a videoconferencing system may comprise a gesture-controlled device 100 for each remotely participating user, with optionally a central server. Gesture recognition, and prioritizing user gestures to control the videoconferencing application running on each gesture-controlled device 100, may be carried out through some combination of local processing (i.e. at each user's gesture controlled device 100) and remote or central processing (i.e. at a central server). In some embodiments, a first gesture-controlled device 100 may be configured to recognize a hand gesture being performed by a local user, with a central server applying a priority ruleset to prioritize gestures being performed simultaneously by users of different gesture-controlled devices 100. In some embodiments, each gesture-controlled device 100 s may send frames captured by the camera of the gesture-controlled device 100 to the central server, which applies a priority ruleset to the collection of frames to prioritize gesture controls collectively. In some embodiments, each gesture-controlled device 100 is configured to prioritize gestures based on a combination of locally-captured frames (e.g. frames captured by the camera of the gesture-control device 100) and information received from the other gesture-controlled devices 100 in the system. In some embodiments, the distributed system is an augmented reality system that includes a single gesture-controlled device 100 and multiple cameras (e.g. a camera array positioned around a physical space) and/or multiple displays. In this embodiment, the single gesture-controlled device 100 is used to recognize hand gestures in frames captured by the camera 102 of the gesture-controlled device 100 and/or the multiple cameras of the system, and the gesture-controlled device uses the recognized hand gesture to control the multiple displays to render information thereon. It will be appreciated that these systems are provided as examples, and that other c distributed system are possible.

It will be appreciated that different embodiments may include different combinations of input and output devices in place of, or in addition to, the camera 102 and display 104. In the context of a VR or AR system, multiple head-mounted displays may be used instead of a single large shared display 104, with one or more cameras 102 used to capture the video used for input as described herein. Feedback information presented to users of such a VR or AR system on each user's respective head-mounted display may be similar to the feedback described herein as being presented on a single shared display 104. In some embodiments, feedback information intended for a single user could be presented only on the targeted user's head-mounted display.

In some embodiments, multiple cameras 102 may be used to capture users' gestures. For example, a VR or AR system may include a separate camera mounted on each user's headset or other VR or AR device, with each user's respective camera used to capture that user's gestures. Similarly, and example videoconferencing, VR, or AR system with multiple users located remotely from each other could use cameras local to each user to capture that user's body and environment in order to recognize that user's gestures. In such an example multi-camera embodiment, the methods and systems described herein could be used to detect, track, and recognize each user's gestures by combining the video frames captured by each camera. This combination of frames from multiple cameras could be accomplished temporally in some embodiments (e.g. processing each frame for gesture recognition sequentially), spatially in some embodiments (e.g. creating a composite video frame encompassing the current frame from each camera, and processing the composite frame for gesture recognition), or by some other method of combining video frame inputs from multiple cameras.

To help in understanding the present disclosure, a discussion of gestures is first provided. In the present disclosure, a hand gesture is generally defined as a distinct hand shape that may be recognized by the gesture-controlled device 100 as a particular command input. A hand gesture may have different shapes and movement. For example, hand gestures may be recognized by the gesture-controlled device 100 as belonging to one of the classes shown in FIGS. 3A-3H. While the examples below are described in the context of hand gestures, in some embodiments a gesture may involve body parts other than a hand, such as a face or arm, or may involve physical elements other than a part of a person's body, such as a held object visible to the camera.

FIG. 3A illustrates an "open hand" gesture 30; FIG. 3B illustrates a "fist" (or "closed hand") gesture 32; FIG. 3C illustrates a "pinch open" gesture 34; FIG. 3D illustrates a "pinch closed" gesture 36; FIG. 3E illustrates a "mute" (or "silence") gesture 38; FIG. 3F illustrates a "like" (or "approve") gesture 40; FIG. 3G illustrates an "others" (or "next") gesture 42; and FIG. 3H illustrates a "touch" (or "select") gesture 44. Other gesture classes may be recognized by the gesture-controlled device 100.

Based on such gesture classes, hand gestures may be categorized into static or dynamic gestures. A static gesture is defined by a single gesture class, and is held in a generally fixed location (e.g., within a defined area that allows for some margin of error) for at least a defined period of time (e.g., 1 second) or at least a defined number of consecutive captured video frames (e.g., 100 frames). For example, the static open hand gesture 30 may be recognized by the gesture-controlled device 100, and in the context of a video playback may be interpreted as a pause command input. The static first gesture 32 may be recognized by the gesture-controlled device 100, and in the context of a video playback may be interpreted as a stop command input.

A dynamic gesture is defined by a combination of one or more gesture classes, locations, and/or movements. For example, a dynamic gesture may be a single gesture class that changes in location over time (e.g., detected at different locations over a captured sequence of frames (i.e. digital images of a video). The open hand gesture 30 that changes in location may be recognized by the gesture-controlled device 100 and interpreted as a command to drag or move an interface object such as a displayed icon).

FIG. 4A illustrates another type of dynamic gesture which may be a combination of gesture classes. In FIG. 4A, the dynamic gesture includes a combination of the touch gesture 44 followed by the fist gesture 32. This dynamic gesture may be recognized by the gesture-controlled device 100 and interpreted as command inputs equivalent to using a mouse device to select and then click on an interface object. In another example, the pinch open gesture 34 followed by the pinch closed gesture 36 may together be recognized as a "pinching" dynamic gesture, which may be recognized by the gesture-controlled device 100 and interpreted as a zoom out command input.

More complex dynamic gestures may involve both combination of gesture classes as well as changes in location. For example, in FIG. 4A, if the touch gesture 44 is detected as changing in location over time (e.g., detected in different locations over a sequence of captured video frames) and followed by the fist gesture 32, the gesture-controlled device 100 may interpret the hand gesture as a command to move a displayed cursor in a way that mirrors the change in location of the touch gesture 44 followed by a click command when the fist gesture 32 is detected.

In another example, the pinch open gesture 34, followed by the pinch closed gesture 36, followed by a change in location of the pinch closed gesture 36, and followed by the pinch open gesture 34 again may together be recognized by the gesture-controlled device 100 as a dynamic "pinch-drag-release" gesture. It should be noted that dynamic gestures that include changes in location may be interpreted as different inputs depending on the particular change in location. For example, a pinch-drag-release gesture with a vertical change in location 46 (or a vertical "drag") of the pinch closed gesture 36, as shown in FIG. 4B, may be interpreted in the context of a video playback as a command input to change the volume. In contrast, a pinch-drag-release gesture with a horizontal change in location 48 of the pinch closed gesture 36, as shown in FIG. 4C, may be interpreted in the context of a video playback as a command input to move forward or backward in the video. Such a pinch-drag-release dynamic gesture may provide an intuitive and convenient way for a user to interact with the gesture-controlled device 100, and may also enable the hand gesture to be detected and recognized by the gesture-controlled device 100 with relatively high accuracy. In particular, the pinch-drag-release dynamic gesture may be detected and recognized by breaking down the dynamic gesture into its static gesture components (e.g., pinch open gesture 34, followed by pinch closed gesture 36, followed by another pinch open gesture 34).

Gesture segmentation and recognition is generally computationally expensive; performing these tasks in a multi-user environment further multiplies the computational resources required. Further, it is often challenging to detect and recognize hand gestures (whether static or dynamic) when there a multiple humans in the FOV. In addition, existing systems do not have clear, methodical rules for resolving situations in which more than one user in a multi-user environment performs a gesture simultaneously.

In various examples, the present disclosure describes solutions that enable the resolution of multiple simultaneous hand gestures performed by multiple users for controlling a gesture-controlled device in a multi-user environment, and for more efficient recognition of hand gestures by a gesture-controlled device in a multi-user environment. The present disclosure describes a system and method that prioritizes detected users or recognized hand gestures based on a predetermined priority ruleset. Three example priority rulesets are described. First, a first-user-in-time ruleset is described that prioritizes hand gestures based on when in time they were begun by a user in the camera FOV. Second, an action-hierarchy ruleset is described that prioritizes gestures based on the actions they correspond to, and the relative positions of those actions within an action hierarchy. Third, a designated-master-user ruleset is described that prioritizes gestures performed by an explicitly designated master user. Methods for designating a new master user are also described. In some examples, the present disclosure also describes a computer-readable medium for carrying out the methods described herein. It will be appreciated that the present disclosure includes additional aspects and features.

The present disclosure describes the use of a virtual gesture-space, at least initially defined as a space surrounding a user's face, for detecting hand gestures. The virtual gesture-space should be smaller than the FOV captured by the camera 102. Only hand gestures detected and recognized within the virtual gesture-space may be considered valid hand gestures. The use of a virtual gesture-space may enable a reduction in false positives in hand gesture detection (e.g., particularly in complex backgrounds), may make it easier to associate a hand gesture to a particular user, and may enable more efficient processing of a frame to recognize a hand gesture.

Figure 5:
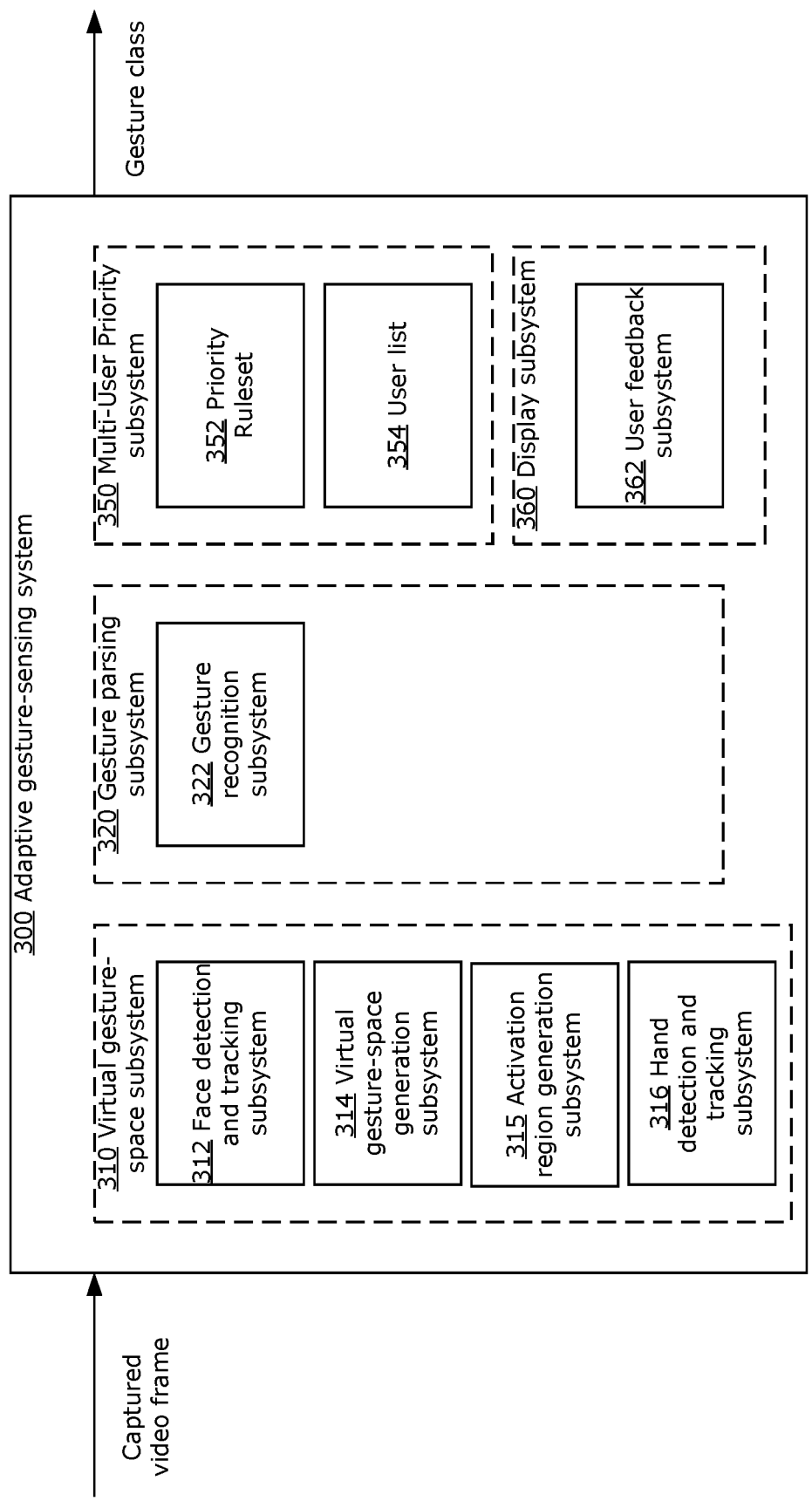
FIG. 5 is a block diagram illustrating some details of an example adaptive gesture-sensing system that may be implemented in an example gesture-controlled device.

FIG. 5 is a block diagram illustrating some example subsystems of the adaptive gesture-sensing system 300. In this example, the adaptive gesture-sensing system 300 may be implemented using a virtual gesture-space subsystem 310, a gesture parsing subsystem 320, a multi-user priority subsystem 350, and a display subsystem 360. In the following examples, the adaptive gesture-sensing system 300 will be described as including all four subsystems 310, 320, 350, 360 or providing the functions of all four subsystems 310, 320, 350, 360. However, in other examples, the adaptive gesture-sensing system 300 may include (or provide the functions of) only one of the virtual gesture-space subsystem 310 or gesture parsing subsystem 320, or may omit the display subsystem 360. For example, the adaptive gesture-sensing system 300 may (e.g., using the virtual gesture-space subsystem 310) provide only adaptive generation of the virtual gesture-space and detection of gestures within the virtual gesture-space, and gesture recognition and parsing may be performed by another component of the gesture-controlled device 100 (e.g., using any suitable existing gesture recognition techniques). In another example, the adaptive gesture-sensing system 300 may (e.g., using the gesture parsing subsystem 320) provide only gesture recognition and management of multiple users, and hand detection may be performed by another component of the gesture-controlled device 100 (e.g., using any suitable existing hand detection techniques).

In some examples, the adaptive gesture-sensing system 300 may not include distinct subsystems 310, 320, 350, 360. Instead, the sub-blocks of the subsystems 310, 320, 350, 360 may be considered sub-blocks of the adaptive gesture-sensing system 300 itself. Thus, the implementation of the adaptive gesture-sensing system 300 using distinct subsystems 310, 320, 350, 360 is optional.

The adaptive gesture-sensing system 300 includes a face detection and tracking subsystem 312, a virtual gesture-space generation subsystem 314, an activation region generation subsystem 315, a hand detection and tracking subsystem 316, a gesture recognition subsystem 322, a priority ruleset 352, a user list 354, and a user feedback subsystem 362. The face detection and tracking subsystem 312, virtual gesture-space generation subsystem 314, activation region generation subsystem 315, and hand detection and tracking subsystem 316 may be part of the virtual gesture-space subsystem 310; the gesture recognition subsystem 322 may be part of the gesture parsing subsystem 320; the priority ruleset 352 and user list 354 may be part of the multi-user priority subsystem 350; and the user feedback subsystem 362 may be part of the display subsystem 360.

In some examples, instead of or in addition to the face detection and tracking subsystem 312, another subsystem (not shown) may be used for detection and tracking of a different anatomical feature (e.g., an entire human body, or a human torso). As will be discussed further below, a different anatomical feature may be used, instead of or in addition to the human face, as the basis for generating the virtual gesture-space. For simplicity, the present disclosure will focus on the use of face detection and tracking, however it should be understood that this is not intended to be limiting.

A captured frame (i.e. digital image) is received by the adaptive gesture-sensing system 300 as an input frame. The face detection and tracking subsystem 312 performs face detection on the input frame. The face detection and tracking subsystem 312 may use any suitable face detection technique to detect a face in the input frame and to generate a bounding box for the detected face. The bounding box may be a two-dimensional (2D) bounding box or three-dimensional (3D) bounding box.

The bounding box generated for the detected face is used by the virtual gesture-space generation subsystem 314 to define the virtual gesture-space. In the present disclosure, a virtual gesture-space (or simply gesture-space) refers to a 2D or 3D space that is defined in the input frame and maps to a virtual space in the real-life environment of the user 10, in which a hand gesture may be detected as a valid hand gesture. In other words, the user 10 may make a hand gesture within the virtually defined 2D or 3D virtual gesture-space in order to provide input to the gesture-controlled device 100. Gestures performed outside of the virtual gesture-space may not be detected and may not be recognized by the gesture-controlled device 100 as a valid hand gesture. The dimensionality of the virtual gesture-space may or may not match the dimensionality of the bounding box of the face (e.g., the bounding box of the face may be 2D and the virtual gesture-space may be 3D).

The virtual gesture-space defined by the virtual gesture-space generation subsystem 314 is used by the hand detection and tracking subsystem 316 to perform hand detection. In particular, the hand detection and tracking subsystem 316 may analyze only the defined virtual gesture-space within the input frame. The hand detection and tracking subsystem 316 may use any suitable hand detection technique to detect a hand in the input frame and to generate a 2D or 3D bounding box for the detected hand.

The bounding box generated for the detected face is used by the activation region generation subsystem 315 in some embodiments to define the activation region. In the present disclosure, an activation region refers to a 2D or 3D space that is defined in the input frame and maps to a virtual space in the real-life environment of the user 10, in which a hand input must be detected in order to be acted upon by the gesture-controlled device 100. In other words, the user 10 may make a hand gesture within the virtual gesture-space, but until the hand gesture is moved within the activation region, the hand gesture is not recognized as a valid input to the gesture-controlled device 100. Some embodiments may not make use of an activation region; in such embodiments, all gestures detected and recognized within the virtual gesture-space are recognized as valid inputs to the gesture-controlled device 100. In embodiments that do make use of an activation region, the dimensions of the activation region may be different from those of the virtual gesture-space. In some examples, the activation region is smaller than the virtual gesture-space and located closer to the user's face or closer to another detected anatomical feature of the user, as described above.

In some examples, the face detection and tracking subsystem 312 may use a trained neural network for performing face detection. Similarly, the hand detection and tracking subsystem 316 may use another trained neural network for performing hand detection. For example, a suitable neural network for face or hand detection may be a trained object detector such as using YoloV3 (e.g., as described in Redmon et al. "Yolov3: An incremental improvement," arXiv preprint arXiv:1804.02767, 2018) based on a residual neural network (ResNet) architecture such as ResNet34 (e.g., as described in He, Kaiming, et al. "Deep residual learning for image recognition." Proceedings of the IEEE conference on computer vision and pattern recognition. 2016). Another example may be a trained single shot detector (SSD) such as multibox SSD (e.g., as described in Liu et al. "Ssd: Single shot multibox detector." European conference on computer vision. Springer, Cham, 2016.) based on a convolutional neural network (CNN) architecuture such as MobileNetV2 (e.g., as described in Sandler et al. "Mobilenetv2: Inverted residuals and linear bottlenecks." Proceedings of the IEEE Conference on Computer Vision and Pattern Recognition. 2018.). Face and hand tracking may be performed by the face detection and tracking subsystem 312 and the hand detection and tracking subsystem 316, respectively, using the Lucas-Kanade optical flow technique (as described in Lucas et al. "An iterative image registration technique with an application to stereo vision." Proceedings of Imaging Understanding Workshop, 1981).

The bounding box generated for the detected hand is used by the gesture recognition subsystem 322 to perform identification and classification of the hand shape as a gesture class. The gesture recognition subsystem 322 may use any suitable gesture classification technique to classify the shape of the detected hand as a particular gesture class. For example, the gesture recognition subsystem 322 may use a trained neural network (e.g., a CNN) that has been trained to classify a gesture according to a predefined set of gesture classes. The gesture recognition subsystem 322 outputs a label that identifies the gesture class. By limiting hand detection and gesture recognition to gestures performed within the virtual gesture-space, the performance of the hand detection and tracking subsystem 316 and/or gesture recognition subsystem 322 may be improved.

A software application (e.g., an operating system) of the gesture-controlled device 100 may translate the gesture class outputted by the adaptive gesture-sensing system 300 into a command input. The translation of the gesture class into the command input may be application-dependent. For example, a given gesture class may be translated into a first command input when a first application is active, but may be translated into a second command input (or may be considered invalid) when a second application is active.

The multi-user priority subsystem 350 is configured to prioritize the recognized hand gestures and allocate computing resources in a multi-user environment. For example, there may be multiple humans captured in the FOV of the camera 102. The face detection and tracking subsystem 312 may thus detect and track multiple human faces. Each detected face may belong to a human who is potentially a user that can provide input to the gesture-controlled device 100. Accordingly, each detected human may be considered a user (or potential user) even if the detected human is not currently providing recognized input. The multi-user priority subsystem 350 may in some examples determine, in the context of a given frame, which users will be tracked by the face detection and tracking subsystem 312, which users will have a virtual gesture-space generated by the virtual gesture-space generation subsystem 314, which users will have their hands tracked by the hand detection and tracking subsystem 316, and which users will have their gestures processed for recognition by the gesture recognition subsystem 322. The computing resources of the adaptive gesture-sensing system 300 may thereby be reserved for tracking and recognizing the gestures of users who are currently prioritized by the multi-user priority subsystem 350.

The multi-user priority subsystem 350 is used in a multi-user environment to determine which users are detected and tracked by the face detection and tracking subsystem 312, virtual gesture-space generation subsystem 314, and hand detection and tracking subsystem 316; which gestures are processed for recognition by the gesture recognition subsystem 322; and which recognized gesture classes are translated into command inputs. In situations in which more than a user in the camera FOV performs a hand gesture while another user in the camera FOV is also performing a hand gesture, the multi-user priority subsystem 350 applies a predetermined priority ruleset 352 to determine which hand gesture should be processed for recognition by the gesture recognition subsystem 322 and translated into a command input. In some embodiments, the priority ruleset 352 may be applied to devote more computing resources to a user determined to have priority. For example, some embodiments may use the priority ruleset to identify a user having priority, called a primary user or master user, thereby causing the face detection and tracking subsystem 312, virtual gesture-space generation subsystem 314, and hand detection and tracking subsystem 316 to only detect and track that user until priority shifts to a different user. Some embodiments may continue to detect and track non-primary users while a first user has priority, but the computing resources devoted to detecting and tracking the non-primary users may be less than the resources devoted to detecting and tracking the primary user. The operation of the multi-user priority subsystem 350 is described and illustrated below with reference to FIGS. 11A-11C.

The user feedback subsystem 362 provides feedback to users via the one or more input/output (I/O) interfaces 204 and output devices such as the display 104. User feedback information presented to users by the user feedback subsystem 362 may include, in some embodiments, feedback information prompting users to move their gestures into the virtual gesture-space and/or into the activation region, and/or feedback information identifying the current primary user. While the user feedback subsystem 362 is described and illustrated as part of a display subsystem 360, in some embodiments the user feedback subsystem 362 may also provide user feedback through other output devices such as speakers. The operation of the user feedback subsystem 362 is described and illustrated below with reference to FIGS. 21 and 22A-B.

The adaptive gesture-sensing system 300 stores and maintains a user list 354 for use in a multi-user environment. The user list 354 keeps track of all detected users, and ranks the detected users according to the priority ruleset 352. The highest ranking user in the user list 354 at a given time may be considered the primary user. A hand gesture recognized in a frame for a detected primary user may be prioritized over any other hand gesture recognized for users detected in the frame. In some examples, only authorized or pre-registered users may be included in the user list 354. For example, a user profile may be associated with an authorized or pre-registered user, and the user profile may contain data (e.g., biometric data) enabling the authorized or pre-registered user to be identified by the gesture-controlled device 100 (e.g., using suitable facial recognition techniques). Such facial recognition of authorized or pre-registered users may be performed by the adaptive gesture-sensing system 300 or by a separate facial recognition system of the gesture-controlled device 100. By restricting the user list 354 to include only authorized or pre-registered users, unauthorized control of the gesture-controlled device 100 may be avoided. Additionally, false positive recognition of a hand gesture may be reduced. In some embodiments, the ranking of a user in the user list 354 determines the degree or amount of processing or computing resources devoted to tracking that user in a sequence of frames and recognizing that user's hand gesture in the sequence of frames. For example, a high-ranked user may be tracked and their hand gesture recognized in a sequence of frames before lower-ranked users hand gestures are recognized in the sequence of frames, potentially eliminating the need to process the sequence of frames to track and recognize hand gestures of the lower-ranked users in some embodiments, for example, when a hand gesture is recognized for the high-ranked user.

Although the adaptive gesture-sensing system 300 is illustrated as having different sub-blocks (or subsystems), it should be understood that this is not intended to be limiting. For example, the adaptive gesture-sensing system 300 may be implemented using greater or fewer numbers of sub-blocks (or subsystems), or may not require any sub-blocks (or subsystems). Further, functions described herein as being performed by a particular sub-block (or subsystem) may instead be performed by another sub-block (or subsystem).

Generally, the functions of the adaptive gesture-sensing system 300 may be implemented in various suitable ways and remain within the scope of the present disclosure.

Examples of the operation of the adaptive gesture-sensing system 300 are now described.

Figure 6:
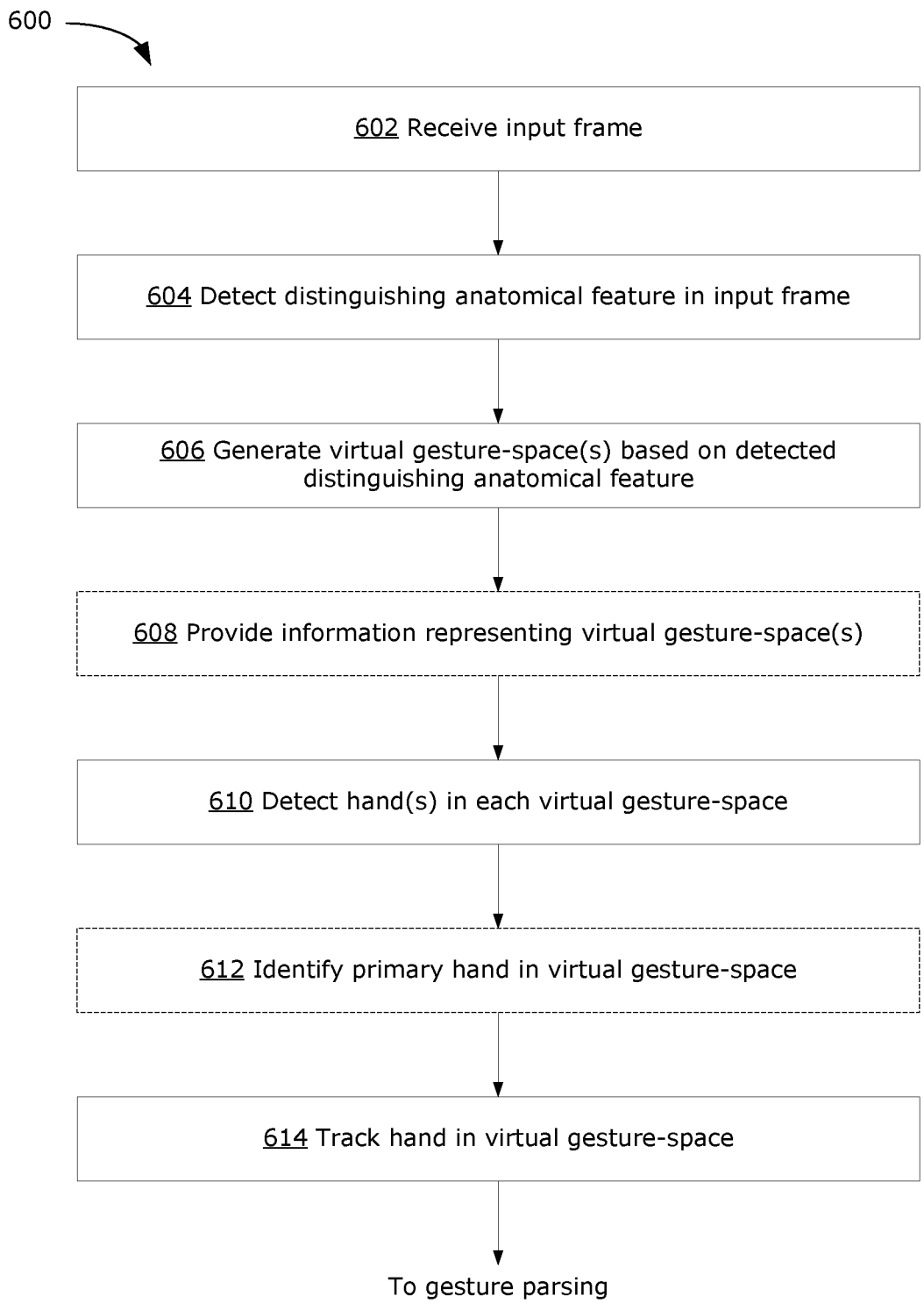
FIG. 6 is a flowchart illustrating an example method for hand detection using a virtual gesture-space.

FIG. 6 is a flowchart illustrating an example method 600 that may be performed by the adaptive gesture-sensing system 300, for example using the virtual gesture-space subsystem 310 (and subsystems 312, 314, 316). The adaptive gesture-sensing system 300 may be software comprising computer-readable code (or computer-readable instructions). The computer-readable code is executable by the processing device 202 of the gesture-controlled device 100 to perform the method 600. Coding of the software of the adaptive gesture-sensing system 300 is well within the scope of a person skilled in the art having regard to the present disclosure. Method 600 may contain additional or fewer processes than shown and described, and may be performed in a different order. The computer-readable code may be stored in memory 208 or a computer-readable medium.

At 602, an input frame captured by the camera 102 is received. Generally, the input frame is received in real-time or near real-time. The input frame may be the raw, unprocessed frame (i.e. digital image) captured by the camera 102, or may be a minimally processed frame (e.g., normalized).

At 604, the adaptive gesture sensing system 300 detects a distinguishing anatomical feature in the input frame. The entire input frame may be processed at step 604. The distinguishing anatomical feature may be any part of a user's body that may be readily detected and distinguished from the background. An example is detection of a human face (e.g., using the face detection and tracking subsystem 312. In some situations, a face may be difficult to be detected, in which case a different anatomical feature (e.g., entire human body, or human torso) may be detected instead. As mentioned above, the anatomical feature may be detected using any suitable approach, including using machine learning-based techniques. Detecting the distinguishing anatomical feature may include determining a location (e.g., represented by a coordinate) of the anatomical feature and generating a bounding box for the distinguishing anatomical feature.

At 606, a virtual gesture-space is generated (e.g., using the virtual gesture-space generation subsystem 314) based on the detected distinguishing anatomical feature (e.g., detected face). In some embodiments, multiple instances of the distinguishing anatomical feature may be detected (e.g., multiple faces may be detected if there are multiple humans within the FOV of the camera 102), in which case one virtual gesture-space may be generated for each respective detected instance of the distinguishing anatomical feature. As will be discussed further below, in some embodiments there may only be one virtual gesture-space generated when multiple instances of the distinguishing anatomical feature are detected, or the generation of virtual gesture-space(s) may be based on ranking or prioritization of the detected instances of the distinguishing anatomical feature.

The virtual gesture-space may be generated using predefined equations related to the location of the respective detected distinguishing anatomical feature. For example, the virtual gesture-space may be generated by calculating a rectangular space relative to a bounding box generated for a detected distinguishing anatomical feature (e.g. detected face). Some example equations are provided further below.

Optionally, at 608, information about the generated virtual gesture-space may be provided by the adaptive gesture-sensing system 300, to enable the gesture-controlled device 100 to provide feedback to the user 10 about the generated virtual gesture-space. For example, the adaptive gesture-sensing system 300 may provide the coordinates or other parameters of the virtual gesture-space, to enable the gesture-controlled device 100 to render on the display 104 (e.g., as an overlay on top of a live image captured by the camera 102) a representation of the virtual gesture-space to the user 10. In another example, the virtual gesture-space may be represented to the user 10 by having an inset or secondary window displayed by the gesture-controlled device 100 to show only a FOV corresponding to the virtual gesture-space. Other ways of providing feedback to the user 10 may also be suitable.

At 610, a hand is detected in each generated virtual gesture-space (e.g., using the hand detection and tracking subsystem 316). The detected hand may be associated with the respective virtual gesture-space in which the hand was detected. If there are multiple virtual gesture-spaces generated, an attempt may be made to detect a hand in each generated virtual gesture-space. If a hand is not detected in a given virtual gesture-space, that given virtual gesture-space may be ignored or discarded.

If no hand is detected in any of the generated virtual gesture-space(s), it may be determined that there is no valid hand gesture detected in the received input frame, and the method 600 may return to step 602 to receive the next input frame captured by the camera 102. Assuming that at least one hand is detected in at least one virtual gesture-space, the method 600 proceeds to optional step 612.

Optionally, at 612, if more than one hand is detected in a given virtual gesture-space, one primary hand may be identified in the given virtual gesture-space. A primary hand may be identified based on, for example, the largest detected hand in the given virtual gesture-space; the detected hand that is closest to the detected distinguishing anatomical feature (e.g., face) in the given virtual gesture-space; or the detected hand that is closest in illumination and/or hue to the detected distinguishing anatomical feature (e.g., face) in the given virtual gesture-space; among other possibilities. In some embodiments, step 612 may be performed by the multi-user priority subsystem 350. If there is only one hand detected in a given virtual gesture-space, it may be assumed that the one hand is the primary hand.

At 614, the detected hand (or primary hand) is tracked in the respective virtual gesture-space (e.g., using the hand detected and tracking subsystem 316). Information from detecting and tracking the hand (or primary hand) is provided for further parsing of the hand gesture. For example, a bounding box and an optional unique identifier for the detected hand may be generated in order to track the detected hand. The bounding box (and the optional the unique identifier) may then be provided (e.g., to the gesture recognition subsystem 322, or other hand classifier).

In some embodiments, the method 600 may be implemented by the adaptive gesture-sensing system 300 using only the virtual gesture-space subsystem 310. Instead of outputting a gesture class (as shown in FIG. 5), the adaptive gesture-sensing system 300 may output information about the tracked hand (e.g., the bounding box and the unique identifier for the detected hand) to a conventional video-based hand gesture recognition system, and the conventional video-based gesture recognition system may perform the hand classification and gesture recognition.

Instead of directly detecting the user's hand, the above-described example first detects a distinguishing anatomical feature (e.g., the user's face) and generates a virtual gesture-space (which is smaller than the FOV captured in the input frame) based on the detected feature. Hand detection is then performed only in the virtual gesture-space. The user's face may be used as the distinguishing anatomical feature for generating a virtual gesture-space because face detection is typically more accurate and reliable than hand detection. By restricting hand detection to the virtual gesture-space, the processing required for hand detection may be simplified, false positives may be reduced, and it may be easier to identify the primary hand.

In some examples, the method 600 may be used to process every frame captured by the camera 102. In other examples, the method 600 may only be used when a hand gesture is expected. For example, the method 600 may be initiated in response to a command input (e.g., via keyboard input, mouse input or voice input). In some examples, the method 600 may be initiated based on detection of human attention. For example, an attention detection technique (e.g., using eye-tracking software) may be used to determine whether a human is looking directly at the gesture-controlled device 100, and the method 600 may be initiated only when a direct human gaze at the device 100 is detected. It may be useful to initiate the method 600 in response to detected human attention, to avoid false positives or incorrect interpretation of hand gesture.

In some examples, the steps of detecting a user, generating a virtual gesture-space for a user, detecting and tracking a hand of the user within the virtual gesture-space, and classifying a gesture of the user's hand within the virtual gesture-space may be collectively referred to as "gesture recognition" or "recognizing a gesture" of the user.

Figure 7:
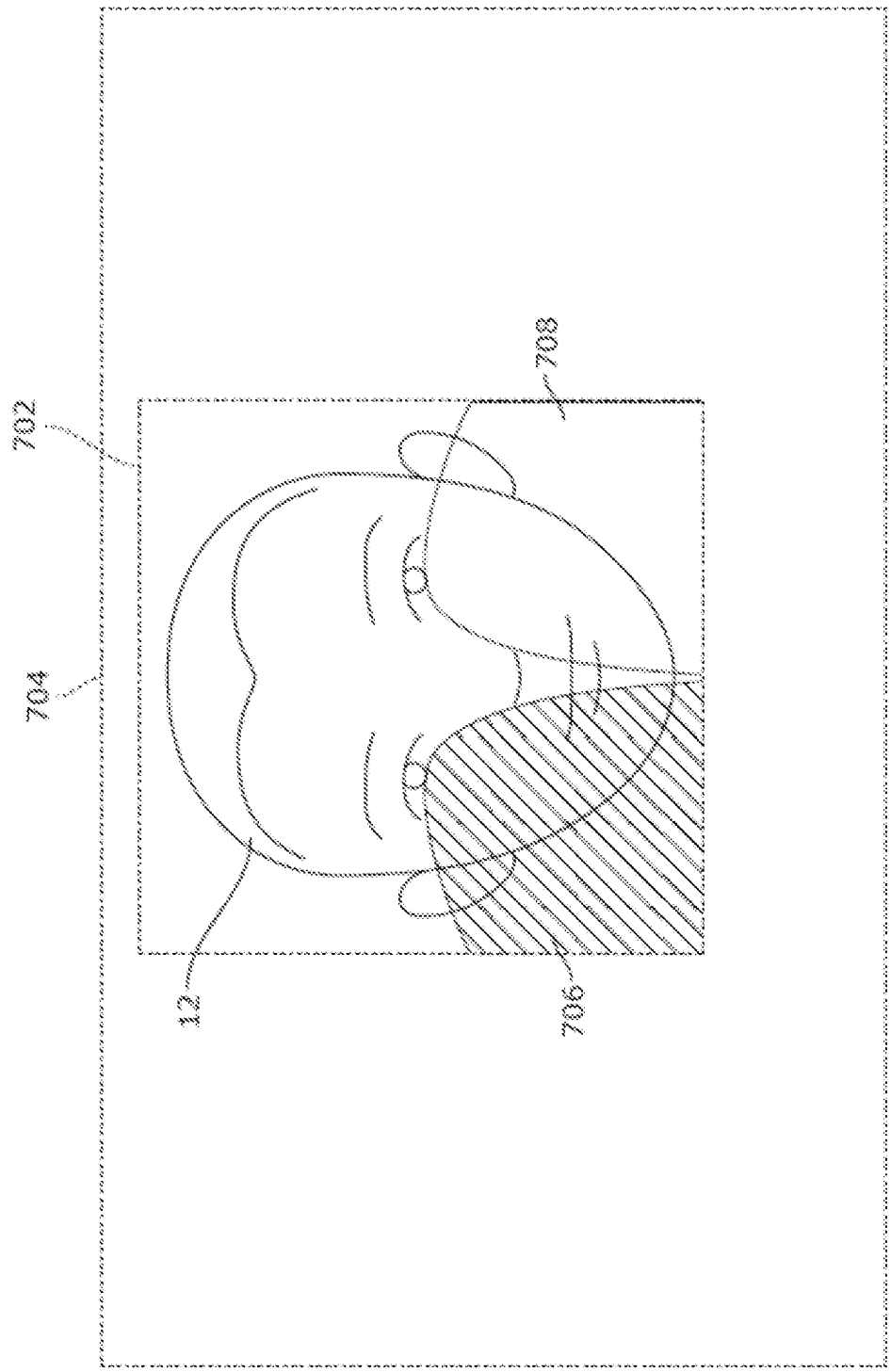
FIG. 7 illustrates an example of a virtual gesture-space including defined subspaces for implementing a virtual mouse.

FIG. 7 illustrates an example implementation of the method 600, in which the virtual gesture-space is generated based on a detected face. In this example, it is assumed that the face 12 of a primary user has been detected (e.g., at step 604), and the face 12 is used as the distinguishing anatomical feature as the basis of the virtual gesture-space.

A bounding box 702 may be generated for the face 12 using any suitable face detection techniques, including machine learning-based techniques as described above. In this example, the generated bounding box 702 is defined by the set of values $\{x_f, y_f, w_f, h_f\}$, where $x_f$ and $y_f$ respectively define the x and y coordinates (in a frame of reference defined by the adaptive gesture-sensing system 300) of the anchor point (e.g., center) of the bounding box 702, and $w_f$ and $h_f$ respectively define the width and height of the bounding box 702. On the basis of the bounding box 702, a virtual gesture-space 704 is generated (e.g., at step 606) and defined by the set of values $\{x_g, y_g, w_g h_g\}$, where $x_g$ and $y_g$ respectively define the x and y coordinates (in the frame of reference defined by the adaptive gesture-sensing system 300) of the anchor point (e.g., center) of the virtual gesture-space 704, and $w_g$ and $h_g$ respectively define the width and height of the virtual gesture-space 704. For example, the following equations may be used to generate the virtual gesture-space 704:

$$x_g = x_f - \frac{\Delta_x}{\partial} w_g$$

$$y_g = y_f - \frac{\Delta_y}{\beta} h_g$$

$$w_g = \partial \cdot w_f$$

$$h_g = \beta \cdot h_f$$

where $(\Delta_x, \Delta_y)$ are predefined relative position parameters, and OA are predefined scale parameters. The parameters $(\Delta_x, \Delta_y)$ and OA may be predefined (e.g., by the user 10 or by a manufacturer of the gesture-controlled device 100) according to result in a desired size of the virtual gesture-space 704 and a desired positioning of the bounding box 702 within the virtual gesture-space 704. It should be noted that, in some examples, the virtual gesture-space 704 may be generated such that the bounding box 702 of the face 12 is partially or entirely outside of the virtual gesture-space 704. That is, although the face 12 may be used as the basis for generating the virtual gesture-space 704, it is not necessary that the virtual gesture-space 704 includes the face 12.

In the example of FIG. 7, the virtual gesture-space 704 is generated as a 2D rectangular area. However, it should be understood that the virtual gesture-space 704 may be generated as a 2D space or a 3D space, and may be generated to have any geometrical shape (e.g., square, rectangle, circle, etc.), a regular shape, or an irregular shape.

In some examples, the virtual gesture-space 704 may further define one or more subspaces 706, 708, which may be used to implement particular input functions. The subspace(s) 706, 708 may be defined (e.g., by the virtual gesture-space generation subsystem 314) based on features of the detected face 12. For example, a left subspace 706 and a right subspace 708 may be defined in the virtual gesture-space, corresponding to lower left and right portions of the detected face 12, based on the locations of detected eyes and nose of the face 12. Detection of a touch (or point) gesture in the left subspace 706 may be interpreted as a left mouse button click input. Similarly, detection of a touch (or point) gesture in the right subspace 708 may be interpreted as a right mouse button click input. In this way, the virtual gesture-space 704 with defined subspaces 706, 708 may be used to implement a virtual mouse. In some embodiments, the dynamic gesture illustrated in FIG. 4A may be detected to implement a virtual cursor. The virtual cursor may be moved (and may be represented via a visual overlay displayed to the user 10) as the touch (or point) gesture 44 is tracked, and a mouse click input may be detected when the closed hand gesture 32 is detected. In this way, a virtual mouse may be implemented.

Figure 8B:
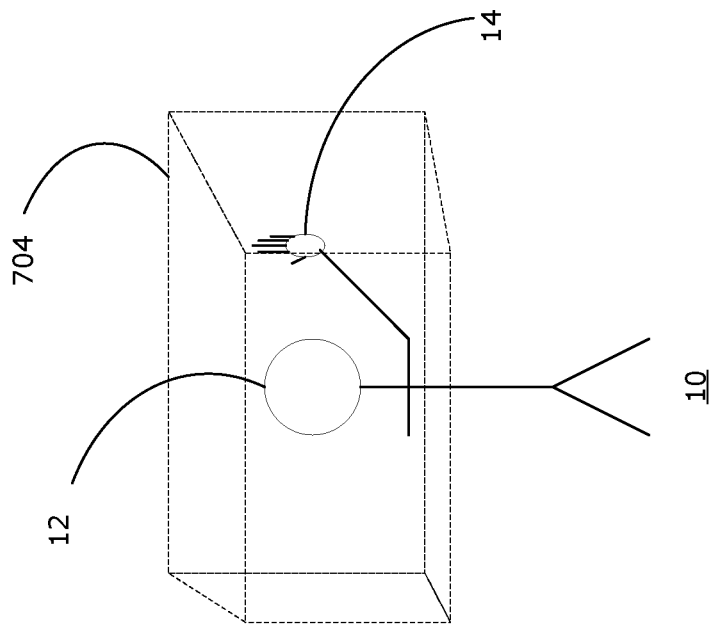
FIGS. 8A and 8B illustrate examples of 2D and 3D virtual gesture-spaces.
Figure 8A:
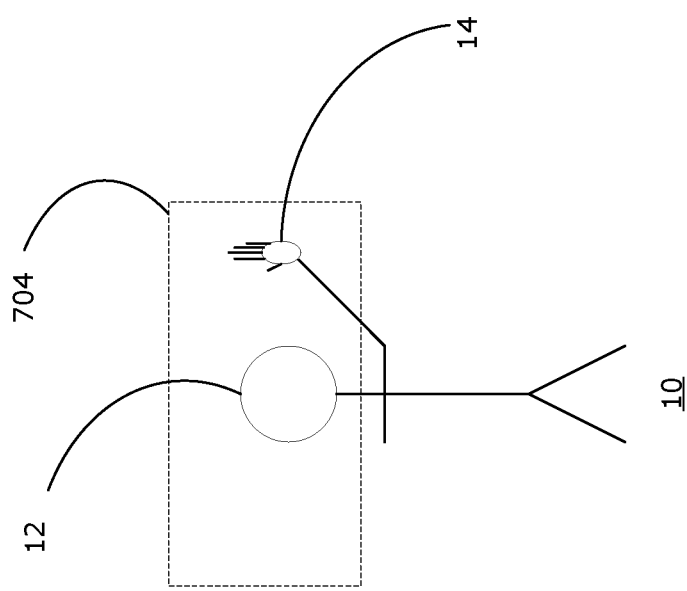

FIGS. 8A and 8B illustrate another example of the virtual gesture-space 704 generated based on a detected face 12 of a user 10. In FIG. 8A, the virtual gesture-space 704 is a 2D rectangular area that includes both the face 12 and a hand 14 of the user 10 (e.g., similar to the example of FIG. 7). In FIG. 8B, the virtual gesture-space 704 is a 3D space that includes both the face 12 and the hand 14 of the user 10. The virtual gesture-space 704 may be generated as a 3D space when depth information is available. For example, depth information may be calculated from multiple frames (e.g. digital images) captured by the camera 102 using video analysis techniques. For example, the gesture-controlled device 100 may use two cameras 102 to calculate depth information (e.g., using computer stereovision techniques), or the camera 102 may be a RGB-depth (RGBD) camera capable of generating depth information (in addition to conventional RGB image information), or the gesture-controlled device may include a time-of-flight (ToF) camera in addition to a conventional camera 102 to acquire RGB image information and additional corresponding depth information. In some examples, depth information may be captured using a sensor (e.g., infrared sensor) capable of capturing depth information, in addition to the camera 102. The use of a 3D virtual gesture-space 704 may be useful to enable depth-based hand gestures for controlling the gesture-controlled device 100

(e.g., moving a hand closer to or farther from the gesture-controlled device 100) to be detected and recognized as command inputs.

In some examples, the virtual gesture-space is initially generated based on the detected distinguishing anatomical feature (e.g., face) and may be subsequently redefined or updated based on the detected hand. In this way, the virtual gesture-space may follow the location of the detected hand, even if the hand moves far away from the distinguishing anatomical feature.

Figure 9:
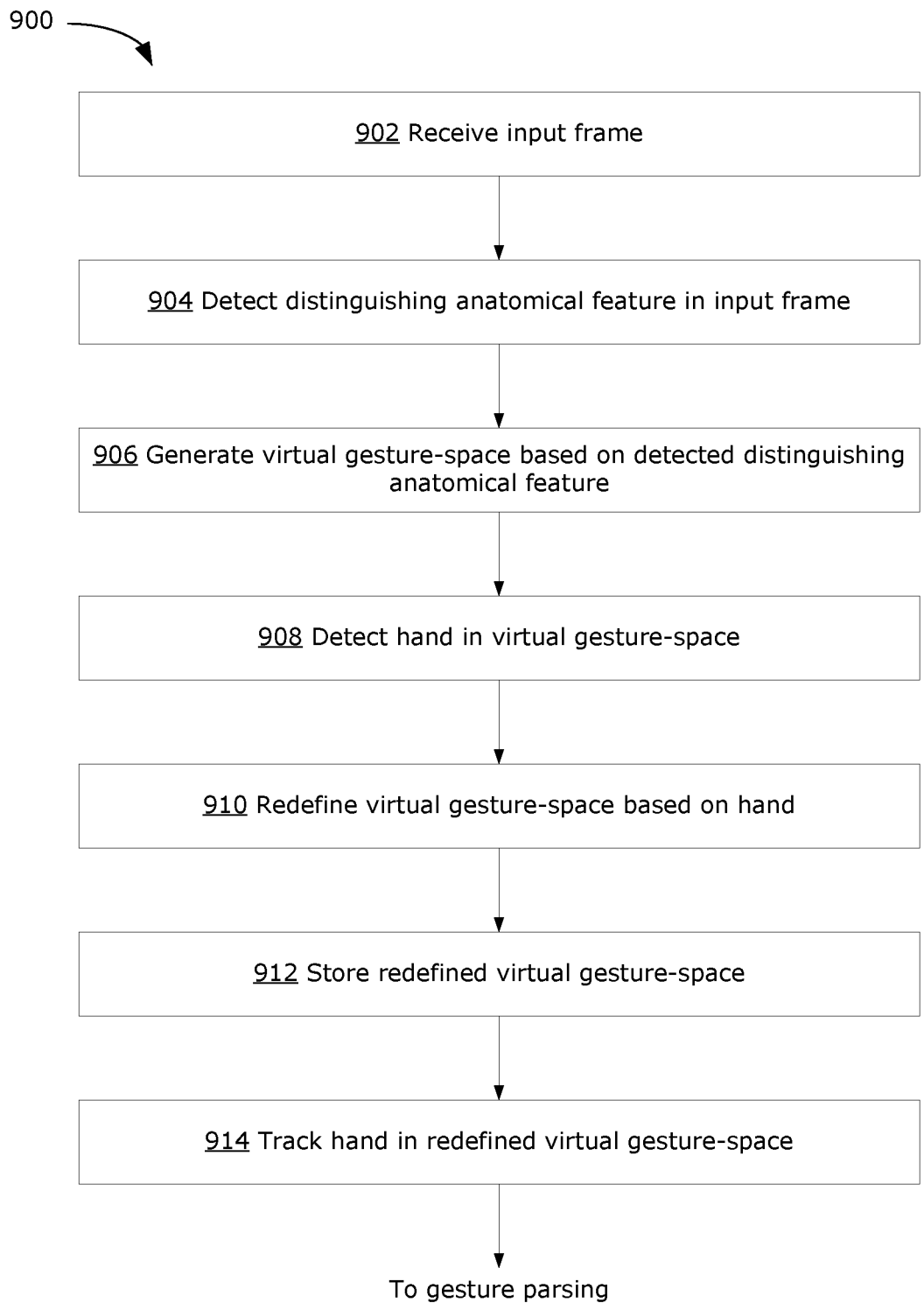
FIG. 9 is a flowchart illustrating an example method for hand detection and virtual gesture-space redefinition based on a detected hand.

FIG. 9 is a flowchart illustrating an example method 900 that may be performed by the adaptive gesture-sensing system 300, for example using the virtual gesture-space subsystem 310 (and subsystems 312, 314, 316). The method 900 may include steps similar to those described for the method 600 above, in which case the similar steps may not be described again in detail.

At 902, an input frame captured by the camera 102 is received. This step may be similar to step 602 described above.

At 904, the adaptive gesture sensing system 300 detects a distinguishing anatomical feature in the input frame. This step may be similar to step 604 described above.

At 906, a virtual gesture-space is generated (e.g., using the virtual gesture-space generation subsystem 314) based on the detected distinguishing anatomical feature (e.g., detected face). This step may be similar to step 606 described above. Optionally, information representing the virtual gesture-space may be provided (e.g., so that feedback may be provided to the user 10). For simplicity, in the following description of the method 900, it is assumed that only one virtual gesture-space is generated. However, it should be understood that the method 900 may be adapted to the case where multiple virtual gesture-spaces are generated (e.g., based on multiple detected instances of the distinguishing anatomical feature).

At 908, a hand is detected in the virtual gesture-space (e.g., using the hand detection and tracking subsystem 316), and associated with the virtual gesture-space in which the hand was detected. This step may be similar to step 610 described above. Optionally, a primary hand may be identified and associated with the virtual gesture-space.

At 910, the virtual gesture-space is redefined based on the detected hand. Redefining the virtual gesture-space may include recalculating the location and/or dimensions of the virtual gesture-space using predefined equations related to the detected hand (instead of being related to the detected anatomical feature). For example, the virtual gesture-space may be redefined such that the virtual gesture-space is centered around the bounding box of the detected hand. Some example equations are described further below.

At 912, the redefined virtual gesture-space is stored. This enables the redefined virtual gesture-space (which was redefined based on the detected hand) to be used as the basis for hand detection and tracking, instead of the initially generated virtual gesture-space (which was initially generated based on the detected distinguishing anatomical feature, such as the detected face).

At 914, the detected hand (or primary hand) is tracked in the redefined virtual gesture-space (e.g., using the hand detected and tracking subsystem 316). This step may be similar to step 614 described above. The bounding box (and the optional unique identifier associated with the detected hand) may be provided (e.g., to the gesture recognition subsystem 322, or other hand classifier).

The method 900 enables the virtual gesture-space to be redefined based on the detected hand, so that the hand may continue to be tracked and detected even if the hand is moved farther away from the distinguishing anatomical feature. After the virtual gesture-space has been redefined based on the detected hand, subsequent input frames may be processed using the redefined virtual gesture-space. The redefined virtual gesture-space may be continuously redefined as the hand changes location in space, such that the virtual gesture-space continues to be centered on the detected hand as the hand moves. For example, subsequent input frames may be processed using a variation of the method 900 in which steps 904 and 906 are omitted.

In some examples, if the hand is no longer detected in the redefined virtual gesture-space, the virtual gesture-space may be re-generated based on the detected distinguishing anatomical feature. In other words, the distinguishing anatomical feature may be used as the anchor or default basis for defining the virtual gesture-space. In some examples, this reversion to using the distinguishing anatomical feature as the default basis for the virtual gesture-space may be performed only if the hand cannot be detected in the redefined virtual gesture-space for more than a predefined number of input frames (e.g., at least 10 input frames).

Figure 10B:
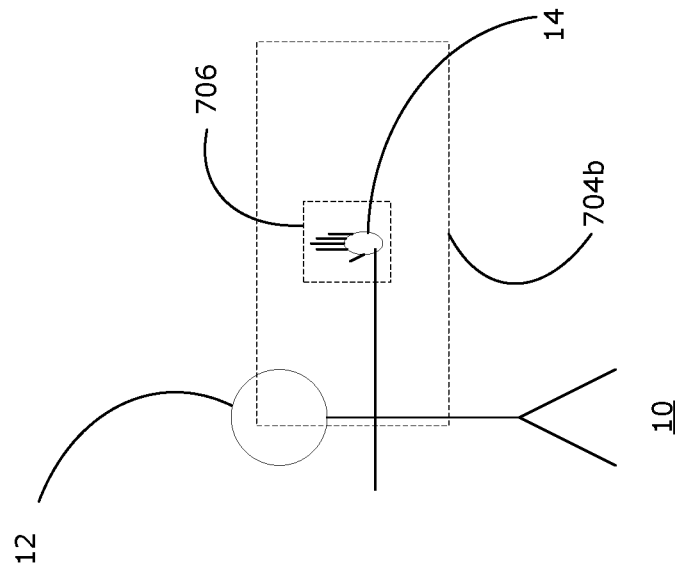
FIGS. 10A and 10B illustrate an example implementation of the method of FIG. 9.
Figure 10A:
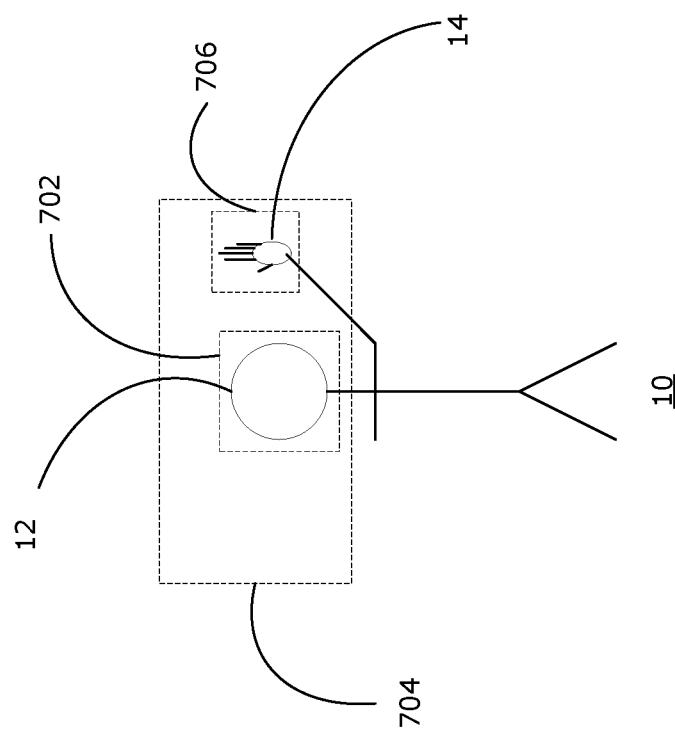

FIGS. 10A and 10B illustrate an example implementation of the method 900, in which the virtual gesture-space 704 is initially generated based on a detected face 12 of a user 10 and is subsequently redefined based on a detected hand 14 of the user 10. In FIG. 10A, the virtual gesture-space 704 is a 2D rectangular area that is generated based on the bounding box 702 of the detected face 12 (e.g., similar to the example of FIG. 7). The hand 14 is detected in the virtual gesture-space 704 and a bounding box 706 for the hand 14 is generated. In FIG. 10B, the virtual gesture-space 704b is redefined based on the bounding box 706 of the hand 14.

For example, the generated bounding box 706 of the hand may be defined by the set of values $\{x_h, y_h, w_h, h_h\}$, where $x_h$ and $y_h$ respectively define the x and y coordinates (in a frame of reference defined by the adaptive gesture-sensing system 300) of the anchor point (e.g., center) of the bounding box 706, and $w_h$ and $h_h$ respectively define the width and height of the bounding box 706. On the basis of the bounding box 706, the virtual gesture-space 704b is redefined (e.g., at step 910). For example, the following equations may be used to redefine the virtual gesture-space 704b:

$$x_g = x_h - \frac{\Delta_{xh}}{\partial_h} w_g$$

$$y_g = y_h - \frac{\Delta_{yh}}{\beta_h} h_g$$

$$w_g = \partial_h \cdot w_h$$

$$h_g = \beta_h \cdot h_h$$

where $\{x_g, y_g, w_g, h_g\}$ are parameters defining the virtual gesture-space 704b as discussed previously, $(\Delta_{xh}, \Delta_{yh})$ are predefined relative position parameters, and $(\partial_h, \beta_h)$ are predefined scale parameters relative to the detected hand. The parameters $(\Delta_{xh}, \Delta_{yh})$ and $(\partial_h, \beta_h)$ may be predefined (e.g., by the user 10 or by a manufacturer of the gesture-controlled device 100) according to result in a desired size of the redefined virtual gesture-space 704b and a desired positioning of the bounding box 706 within the redefined virtual gesture-space 704b. Notably, as illustrated in the example of FIG. 10B, the face 12 may be partially or entirely excluded from the redefined virtual gesture-space 704b.

In some examples, when multiple humans are detected (e.g., multiple faces are detected by the face detection and tracking subsystem 312), the adaptive gesture-sensing system 300 may implement the priority ruleset 352 to generate the user list 354 to identify one human as the primary user (or primary controller). In some embodiments, the virtual gesture-space may be generated only for the primary user. In some embodiments, greater computing resources may be devoted to generating and monitoring the virtual gesture-space for the primary user than for the non-primary users.

Figure 11A:
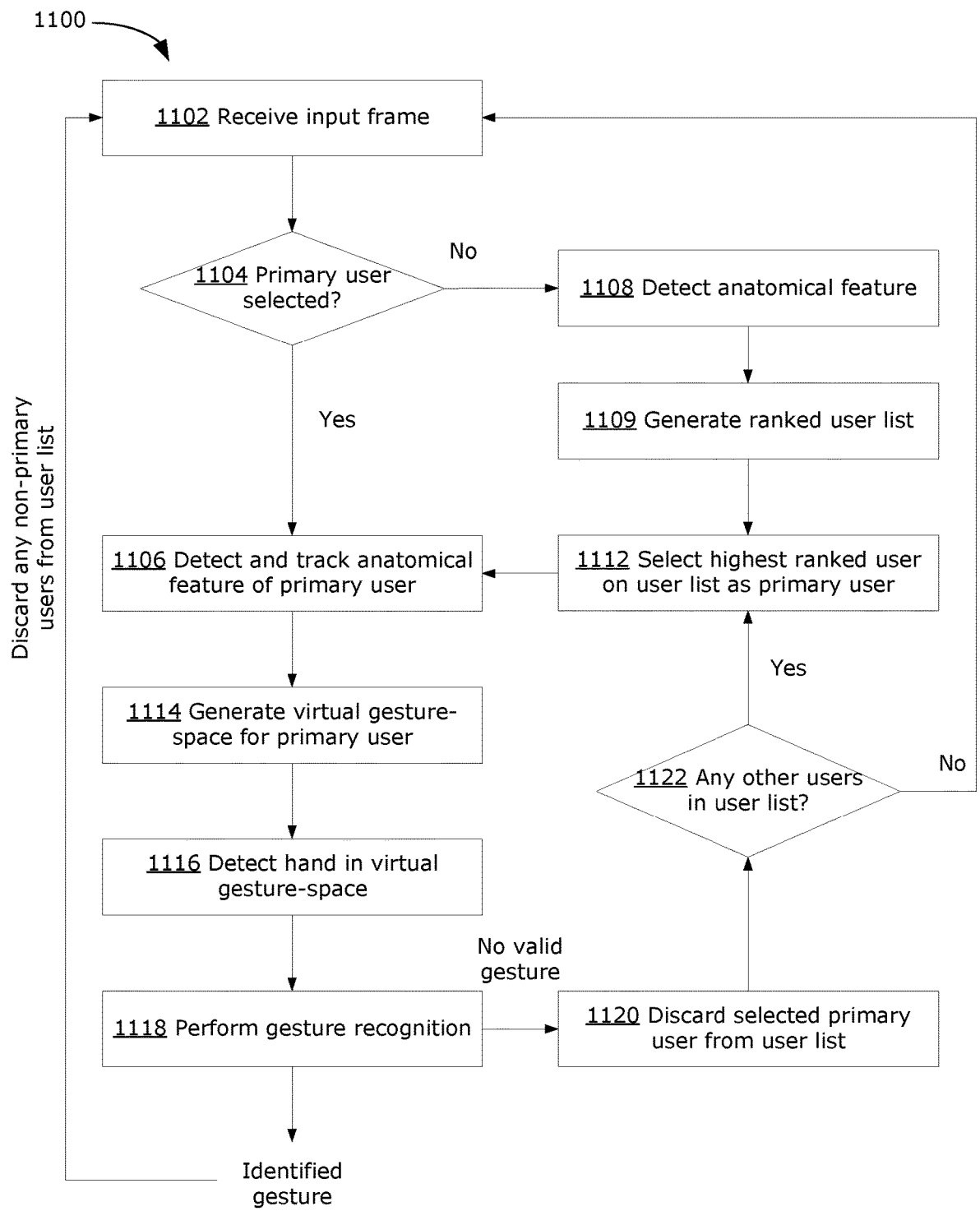
FIG. 11A is a flowchart illustrating an example method for hand detection using a virtual gesture-space, with implementation of a user list and a first-user-in-time ruleset for multi-user priority.

FIG. 11A is a flowchart illustrating an example method 1100 that may be performed by the adaptive gesture-sensing system 300, for example using the virtual gesture-space subsystem 310, the gesture parsing subsystem 320, and the multi-user priority subsystem 350 (and subsystems 312, 314, 316, 322, 352, 354). The method 1100 uses a first-user-in-time ruleset as its priority ruleset 352 to resolve multiple simultaneous hand gestures by multiple users. The method 1100 may include steps similar to those described for the method 600 above, in which case the similar steps may not be described again in detail.

In method 1100, the priority ruleset 352 is a first-user-in-time ruleset. The first user within the camera FOV to perform a valid hand gesture is considered the primary user until the first user's hand gesture is resolved, e.g. by being completed, by being aborted, or by remaining incomplete when a gesture time-out timer reaches a predetermined timeout duration. While the first user is performing the hand gesture within the timeout duration and is therefore designated as the primary user, no other user is tracked or monitored by the face detection and tracking subsystem 312, the virtual gesture-space generation subsystem 314, the activation region generation subsystem 315, the hand detection and tracking subsystem 316, or the gesture recognition subsystem 322. Thus, once a first user has initiated a valid hand gesture, hand gestures made by a second user will be ignored by the system 300 until the first user completes the hand gesture, stops making the hand gesture, or reaches the time limit for completing the hand gesture. Applying the first-user-in-time ruleset as the priority ruleset in method 1100 therefore determines the relationship between the various steps of the method 1100 with respect to how the user list 354 is generated and processed, and in particular with respect to how the primary user is treated in relation to the non-primary users.

At 1102, an frame captured by the camera 102 is received as an input frame. This step may be similar to step 602 described above.

At 1104, it is determined whether a primary user has already been identified and selected. For example, a primary user may have been identified and selected from analyzing a previous input frame. If a primary user has already been selected, the method 1100 proceeds to step 1106; otherwise the method 1100 proceeds to step 1108.

At 1106, the distinguishing anatomical feature (e.g., face) of the primary user is detected and tracked (e.g., using the face detection and tracking subsystem 312) by processing at least a portion of the frame to detect the primary user visible at a first location in the frame, as described with reference to FIG. 6 above. If the primary user was identified in a previous input frame, a virtual gesture-space may have already been defined for the primary user. In such a case, the detection and tracking of the anatomical feature may be performed by analyzing only the already defined virtual gesture-space. Tracking of the anatomical feature may be performed every frame, but detection may be performed at a lower frequency (e.g., skipping one or more frames). Detection may be performed to correct tracking error (e.g., tracking error may be accumulated when tracking over a number of frames). It should be noted that, although this discussion is in the context of detecting and tracking the distinguishing anatomical feature (e.g., face) of the primary user, a modification of step 1106 may be performed to detect and track the hand of the primary user, in the case where the virtual gesture-space is redefined based on the detected hand (e.g., as discussed above with respect to FIGS. 10A and 10B).

At 1108, if no primary user has been previously selected, the entire input frame may be processed to detect instances of the distinguishing anatomical feature (e.g., all instances of human faces), for example using the face detection and tracking subsystem 312. At least a portion of the input frame is processed to detect a first user visible at a first location in the frame and at least a portion of the frame is processed to detect a second user visible at a second location in the frame. A bounding box and identifier may be generated for each detected anatomical feature. If no instances of the distinguishing anatomical feature is detected in the input frame, then the method 1100 may return to 1102 to process the next input frame.

At 1109, a ranked user list 354 is generated based on the detected instances of the anatomical feature. Each detected instance may be associated with a respective detected user.

In cases where no primary user is designated by the priority ruleset 352 because no user has initiated a hand gesture, a default primary user may be selected by the multi-user priority subsystem 350 from among the visible users in the camera FOV, using a set of default user ranking rules. In some embodiments, the default user ranking rules may be included in the priority ruleset 352. The user list 354 may be ranked by further analyzing the detected anatomical feature (e.g., using any suitable facial analysis techniques, such as any eye tracking techniques), according to pre-defined ranking criteria. For example, if the anatomical feature is a face, the ranking criteria may specify that larger faces (which are assumed to be closer to the gesture-controlled device 100) are ranked higher than smaller faces; faces oriented towards the gesture-controlled device 100 may be ranked higher than faces oriented away from the gesture-controlled device; or faces with eyes gazing at the gesture-controlled device 100 may be ranked higher than faces with eyes looking away from the gesture-controlled device 100. Other ranking criteria may be used. If there is only one instance of the distinguishing anatomical feature detected, that one instance may be ranked highest in the list by default.

At 1112, the highest ranking user in the ranked user list 354 is selected as the primary user. If there is only one user in the user list 354, then that user may be selected as the primary user by default. The method 1100 then proceeds to step 1106 to track the anatomical feature of the primary user.

At 1114, a virtual gesture-space is generated for the primary user. If the virtual gesture-space has been previously defined (based on analysis of a previous input frame), the already defined virtual gesture-space may be used instead of generating the virtual gesture-space. Otherwise, the virtual gesture-space is generated based on the detected distinguishing anatomical feature (e.g., face) of the primary user (e.g., similar to step 606 described previously). The virtual gesture-space generation subsystem is thereby used to define a first virtual gesture-space corresponding to a first region of the frame proximal to the location in the frame of the primary user. Optionally, information representing the virtual gesture-space may be provided to an output device such as the display 104, e.g., so that feedback may be provided to the primary user.

At 1116, a hand is detected in the virtual gesture-space (e.g., using the hand detection and tracking subsystem 316). This step may be similar to step 610 described above. Optionally, if more than one hand is detected in the virtual gesture-space, a primary hand may be identified (e.g., based on some predefined criteria, such as hand size) and associated with the virtual gesture-space. Optionally, the virtual gesture-space may be redefined based on the detected hand (similar to that described above for FIG. 9). If the virtual gesture-space has been redefined based on a detected and tracked hand, then hand detection and tracking may have already been performed at step 1106, and this step may not be needed.

At 1118, gesture recognition is performed (e.g., using the gesture recognition subsystem 322) for the detected hand (e.g., as defined by a bounding box). The first region of the frame corresponding to the virtual gesture-space is thereby processed using the gesture recognition subsystem 322 to recognize a hand gesture being performed by the primary user and generate a label indicative of a gesture class for the recognized hand gesture, as described above with reference to FIG. 6. The label may be information or data identifying the gesture class. If a valid hand gesture is recognized, the label corresponding to the gesture class of the recognized hand gesture is outputted, to be translated to a command input for a software application, for example. Any non-primary users in the user list 354 are discarded (that is, keeping only the primary user) and the method 1100 returns to 1102 to receive and process the next input frame.

Applying the first-user-in-time ruleset as the priority ruleset in method 1100 therefore determines that the hand gesture performed by the primary user has priority, because the primary user is identified as the first user in time who makes a hand gesture recognized by the gesture recognition subsystem 322. Put another way, the primary user is identified as such because the gesture recognition subsystem 322 does not recognize a hand gesture within the virtual gesture-space of each other higher-ranked user in the user list 354. In response to determining that the primary user's hand gesture has priority, an action of the gesture-controlled device (e.g. an action of a software application corresponding to the command input) is initiated, where the action corresponds to the primary user's hand gesture.

The first-user-in-time ruleset also reserves computational resources to be used on tracking and recognizing hand gestures of the primary user. When a subsequent frame of the video is received at a new iteration of step 1102, the primary user will be identified at step 1104, with steps 1106, 1114, 1116, and 1118 repeated only for the primary user. If the primary user is still performing a valid hand gesture, as determined by the gesture recognition subsystem 322 at step 1118, then the method 1100 does not devote any computational resources to carrying out steps 1106, 1114, 1116, or 1118 for any other users visible in the frame.

In some embodiments using an activation region, the first user to perform a valid hand gesture within his or her virtual gesture-space may be designated as the primary user regardless of whether the hand gesture is performed within the activation region. A detailed example of a method for gesture control using an activation region is described below with reference to FIGS. 19A-19B and 20A-C. In the present example method 1100, in examples where an activation region is used, once a first user is determined at step 1118 to be performing a valid hand gesture within the virtual gesture-space but not within the activation region, the method 1100 returns to step 1102 with the first user designated as primary user, but the hand gesture being performed by the first user is not outputted to be translated to a command input for a software application. The first user will remain the primary user for each subsequent frame in which the user is determined to be performing a valid hand gesture within the virtual gesture-space, until a timeout timer expires or the user stops performing the hand gesture within the virtual gesture-space. However, the label corresponding to the gesture class of the hand gesture will not be outputted to be translated to a command input for a software application until the hand gesture is performed within the activation region.

If the gesture recognition fails to identify a valid hand gesture (e.g., the hand shape cannot be classified in any predefined gesture class), or if the hand gesture is not a valid hand gesture for the currently active software application (e.g., the software application reports an invalid input back to the adaptive gesture-sensing system 300), the method 1100 proceeds to step 1120.

At 1120, the currently selected primary user is discarded from the user list 354.

At 1122, it is determined whether there is any other user in the user list 354. If there is at least one remaining user in the user list 354, then at step 1112 the highest ranked remaining user in the user list 354 is selected as the primary user, and the method 1100 proceeds to step 1106 as described above. If there is no remaining user in the user list 354, then the method 1100 returns to step 1102 to receive and process the next input frame.

The user list 354 enables the adaptive gesture-sensing system 300 to analyze and process hand gestures, with reduced false positives, even when there are multiple humans within the FOV of the camera 102. The user list 354 may be a relatively efficient way to accommodate the presence of multiple humans, however other techniques may be used instead of or in addition to the user list 354 as discussed above. In some embodiments discussed above, detection of the distinguishing anatomical feature (e.g., human face) may be performed by processing an entire input frame. In other examples, discussed below, detection of the distinguishing anatomical feature may be performed by processing only a region of interest (ROI) within the input frame. For example, at step 1108 described above, an adaptive ROI approach may be used (e.g., by the face detection and tracking subsystem 312 for face detection).

In some embodiments discussed above, feedback information may be provided to an output device such as display 104 using the user feedback subsystem 362. The feedback information may be presented to at least the primary user and potentially the other users on the display 104 or through the other output device (such as audio feedback presented through a speaker). The feedback information indicates that the hand gesture being performed by the primary user has priority. This feedback information may reduce confusion among users and clarify which user's hand gestures are being used to control the gesture-controlled device. A detailed example of such feedback information is described with reference to FIG. 21 below.

Figure 11B:
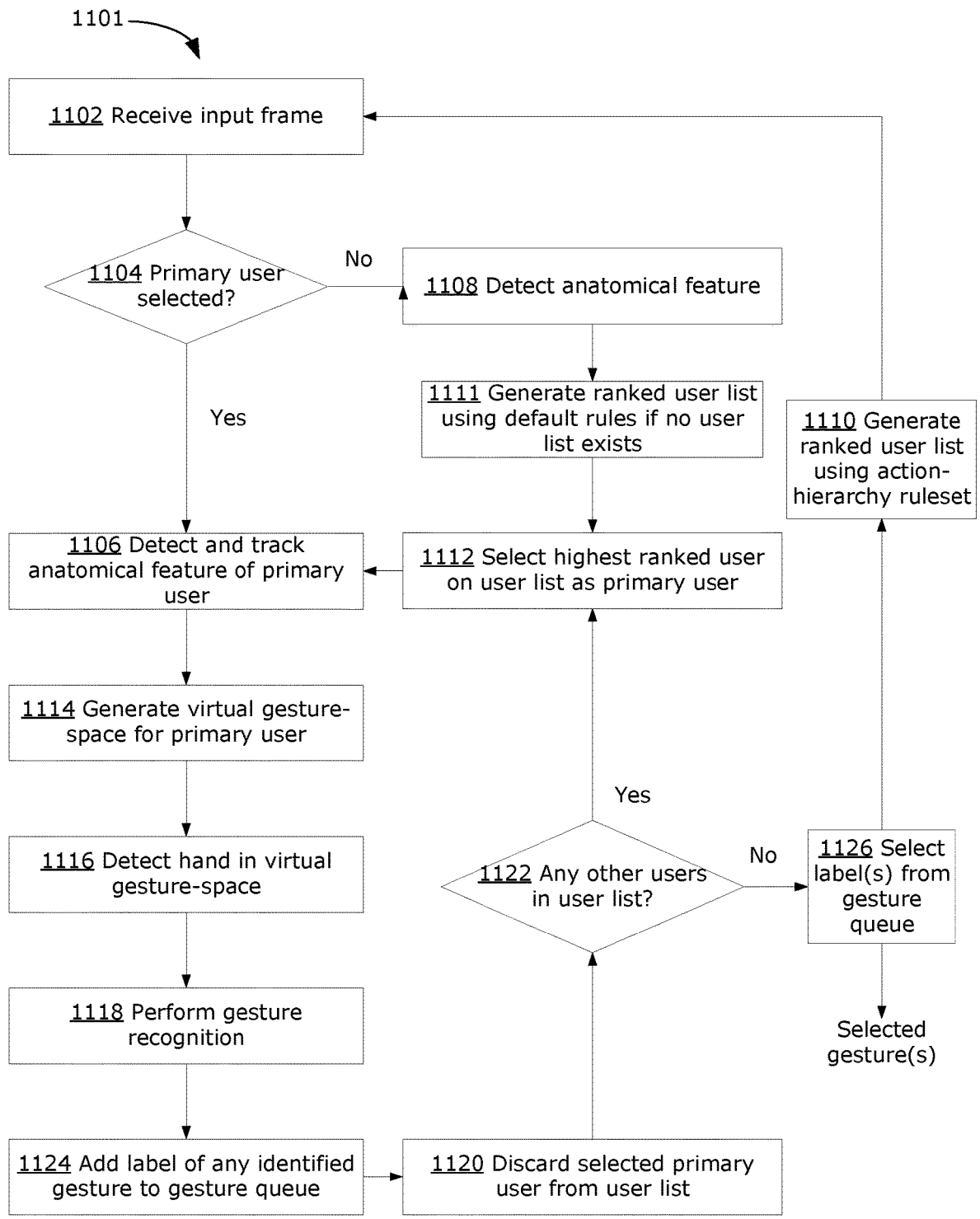
FIG. 11B is a flowchart illustrating an example method for hand detection using a virtual gesture-space, with implementation of a user list and an action-hierarchy ruleset for multi-user priority.

FIG. 11B is a flowchart illustrating an example method 1101 that may be performed by the adaptive gesture-sensing system 300, for example using the virtual gesture-space subsystem 310, the gesture parsing subsystem 320, and the multi-user priority subsystem 350 (and subsystems 312, 314, 316, 322, 352, 354). The method 1101 uses an action-hierarchy ruleset as its priority ruleset 352 to resolve multiple simultaneous hand gestures by multiple users. The method 1101 may include steps similar to those described for the methods 600 or identical to those described for 1100 above, in which case the similar steps may not be described again in detail.

In method 1101, the priority ruleset 352 is an action-hierarchy ruleset. The various actions corresponding to the various gesture classes are ranked or positioned in an action hierarchy, with actions occupying higher positions in the action hierarchy having a higher priority than actions positioned lower in the action hierarchy. In an example embodiment presenting video content on a smart television, an action hierarchy may be pre-defined as the following order of actions, from high to low priority: Turn off the TV>mute the audio>change the channel>navigate the video>change the volume. In some embodiments, users may be allowed to configure the action hierarchy based on user preferences.

In different embodiments, the action-hierarchy ruleset may resolve simultaneous hand gestures using either a simple resolution procedure or a complex resolution procedure. Embodiments using a simple resolution procedure ignore hand gestures corresponding to actions lower in the action hierarchy when hand gestures corresponding to actions higher in the action hierarchy are being performed. Thus, given the example predetermined action hierarchy described above, if a first user is performing a hand gesture corresponding to a "navigate the video" action (e.g. skipping ahead in the video stream by 10 seconds) while a second user is simultaneously performing a hand gesture corresponding to a "mute the audio" action, the hand gesture of the first user will be ignored, the audio will be muted, and the video stream will not skip ahead. In contrast, embodiments using a complex resolution procedure will consider whether two simultaneous hand gestures correspond to conflicting or non-conflicting actions. If the actions are conflicting (such as two users seeking to change the volume, or one user seeking to change the channel while another seeks to turn off the television), only the higher-priority action is initiated, based on some combination of the relative positions of the two actions in the action hierarchy (e.g. "turn off the television" is higher priority than "change the channel") and the ranking of the users in the user list 354 (e.g. when two user seek to change the volume simultaneously, the higher-ranked user in the user list 354 has the action corresponding to his or her hand gesture initiated). If the actions are not conflicting, on the other hand, the complex resolution procedure will initiate both actions (e.g. if one user seeks to change the channel while another user seeks to change the volume, both actions may be initiated). In some embodiments, a complex resolution procedure may be used in which some conflicting actions which are similar in nature may be aggregated: for example, multiple users seeking to change the audio volume or navigate within the video may have the actions corresponding to their hand gestures aggregated according to a predetermined aggregation scheme, such as summing the volume changes being sought by the multiple users.

The action-hierarchy ruleset used as the priority ruleset 352 in method 1101 therefore determines the relationship between the various steps of the method 1101 with respect to how the user list 354 is generated and processed, and with respect to how the primary user is treated in relation to the non-primary users.

Steps 1102, 1104, and 1108 proceed as in method 1100.

At step 1111, if no user list 354 has been generated yet (e.g. from a previous iteration of step 1110 as described below), the user list 354 is generated with users ranked according to the default ranking rules and criteria described above with reference to FIG. 11A, step 1109. If a user list 354 already exists, or after a user list 354 is generated using the default ranking rules, the method 1101 proceeds to step 1112.

Steps 1112, 1106, 1114, 1116, and 1118 proceed as in method 1100.

After step 1118, regardless of whether a valid hand gesture is recognized at step 1118, the method 1101 proceeds to step 1124.

At 1124, if a valid hand gesture is recognized, the label corresponding to the gesture class of the recognized hand gesture is added to a gesture queue. In some embodiments, the gesture queue may be stored in the memory 208 as an array of gesture classes, each label being associated with the user performing the hand gesture.

Steps 1120 proceeds as in method 1100.

At 1122, it is determined whether there is any other user in the user list 354. If there is at least one remaining user in the user list 354, then at step 1112 the highest ranked remaining user in the user list 354 is selected as the primary user, and the method 1101 proceeds to step 1106 as described above. If there is no remaining user in the user list 354, then the method 1101 proceeds to step 1126.

At step 1126, the gesture queue is processed, using the priority ruleset 352, to identify the actions corresponding to the gesture classes stored in the gesture queue and select one or more of the queued labels to act upon by applying the priority ruleset 352. The priority ruleset 352 in present method 1101 is an action-hierarchy ruleset, as described in detail above. The selected label or labels are outputted, to be translated to command inputs for a software application for example. In embodiments using a complex resolution procedure, as described above, two or more actions may be selected for execution, or two or more actions may be aggregated before being outputted for execution. In embodiments using an activation region, as described with reference to method 1100, the selected action or actions may not be outputted for execution until the hand gestures are performed within an activation region.

At step 1110, the user list is re-generated. The primary user is designated as the user performing a currently queued label corresponding to an action occupying a higher position in the action hierarchy than any other currently queued label. Any additional users may be ranked in the user list 354 below the primary user based on whether they are currently performing a queued label, with their relative rakings based on the position within the action hierarchy of their queued labels. Users not currently performing a hand gesture with a corresponding label included in the gesture queue may be ranked in the user list 354 using the default ranking criteria described above with respect to method 1100. In cases of multiple users performing hand gestures corresponding to actions occupying the same position in the action hierarchy, the default ranking criteria may be used to rank these users relative to one another.

In cases where no primary user is designated by the priority ruleset 352 because no user has initiated a hand gesture, the default user list 354 generated at step 1111 may remain unchanged.

After generating the user list 354 at step 1110, the method 1101 then returns to step 1102 to receive and process the next input frame.

Figure 11C:
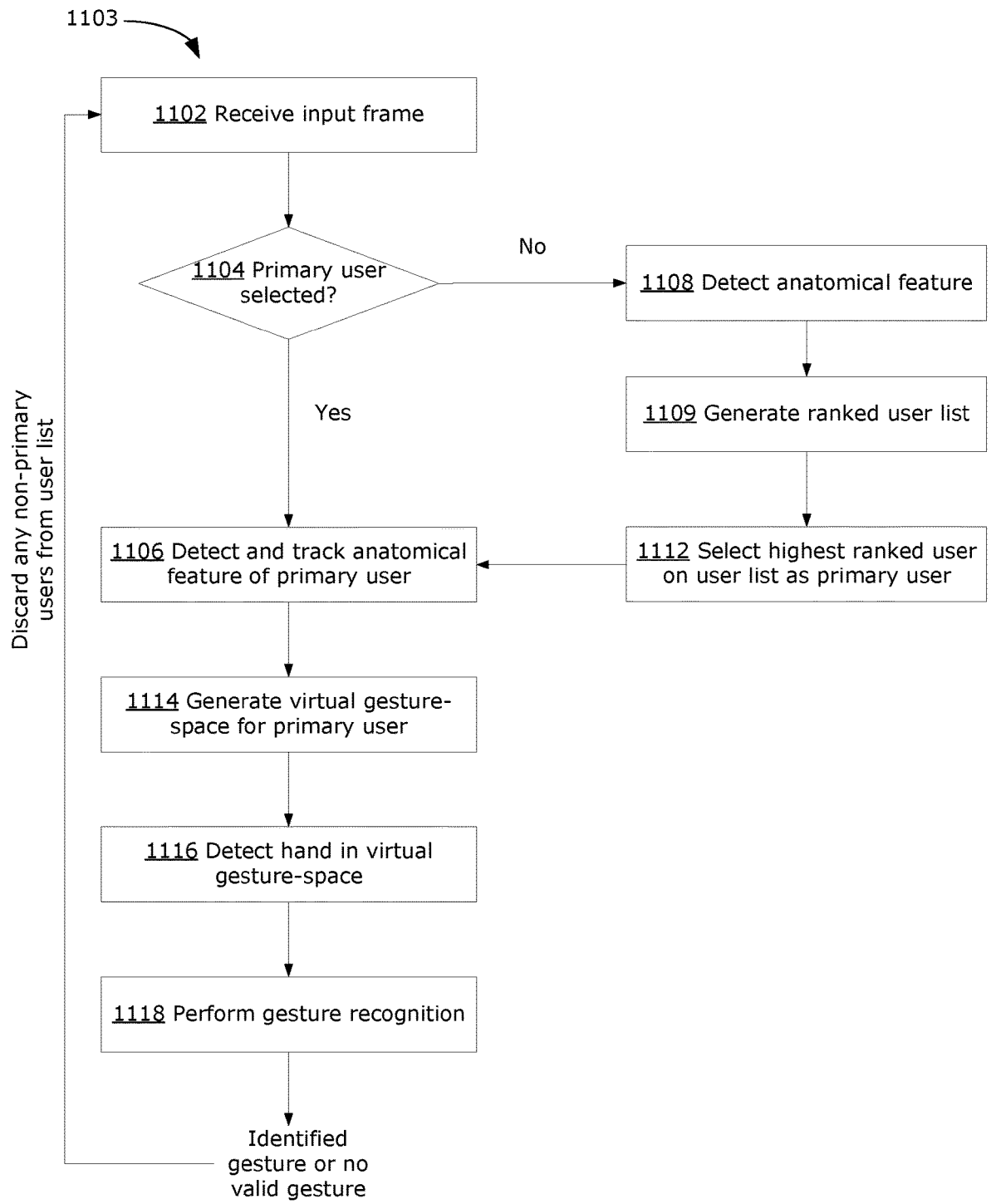
FIG. 11C is a flowchart illustrating an example method for hand detection using a virtual gesture-space, with implementation of a user list and a designated-master-user ruleset for multi-user priority.

FIG. 11C is a flowchart illustrating an example method 1103 that may be performed by the adaptive gesture-sensing system 300, for example using the virtual gesture-space subsystem 310, the gesture parsing subsystem 320, and the multi-user priority subsystem 350 (and subsystems 312, 314, 316, 322, 352, 354). The method 1103 uses a designated-master-user ruleset as its priority ruleset 352 to resolve multiple simultaneous hand gestures by multiple users. The method 1103 may include steps similar to those described for the methods 600 or identical to those described for 1100 above, in which case the similar steps may not be described again in detail.

In method 1103, the priority ruleset 352 is a designated-master-user ruleset. The designated-master-user ruleset operates by identifying a single primary user, called the master user, and monitoring tracking the single master user for gesture controls. In some embodiments, the master user may perform a hand gesture to transfer master user status to a different user; an example of such a procedure is described in detail below with reference to FIGS. 22A-C.

Steps 1102, 1104, 1108, and 1109 proceed as in method 1100. The primary user as determined by the default ranking rules and criteria at step 1109 is designated as the master user. This user remains the master user unless he or she leaves the camera FOV or designates another user as the master user, as described in detail below with reference to FIGS. 22A-C.

Steps 1112, 1106, 1114, 1116, and 1118 proceed as in method 1100.

After step 1118, if a valid hand gesture is recognized, the label of the corresponding gesture class is outputted, to be translated to a command input for a software application for example. Regardless of whether a valid hand gesture is recognized at step 1118, any non-primary users in the user list 354 are then discarded (that is, keeping only the primary user as the master user) and the method 1103 returns to 1102 to receive and process the next input frame. In embodiments using an activation region, as described with reference to method 1100, the selected action or actions may not be outputted for execution until the hand gestures are performed within an activation region.

In some examples discussed above, detection of the distinguishing anatomical feature (e.g., human face) may be performed by processing an entire input frame. In other examples, discussed below, detection of the distinguishing anatomical feature may be performed by processing only a region of interest (ROI) within the input frame. For example, at step 1108 described above, an adaptive ROI approach may be used (e.g., by the face detection and tracking subsystem 312 for face detection).

An adaptive ROI, in the present disclosure, may be considered "adaptive" in the sense that the size and/or location of the ROI may be adjusted based on the requirements of the face detector, the resolution of the input frame, or processing efficiency, for example. For example, machine learning-based face and hand detectors are typically trained to process a square input image. Accordingly, for improved performance in face and hand detection, the ROI for performing detection should be a square. For similar reasons, the virtual gesture-space for hand detection may be defined as a square.

Figure 12:
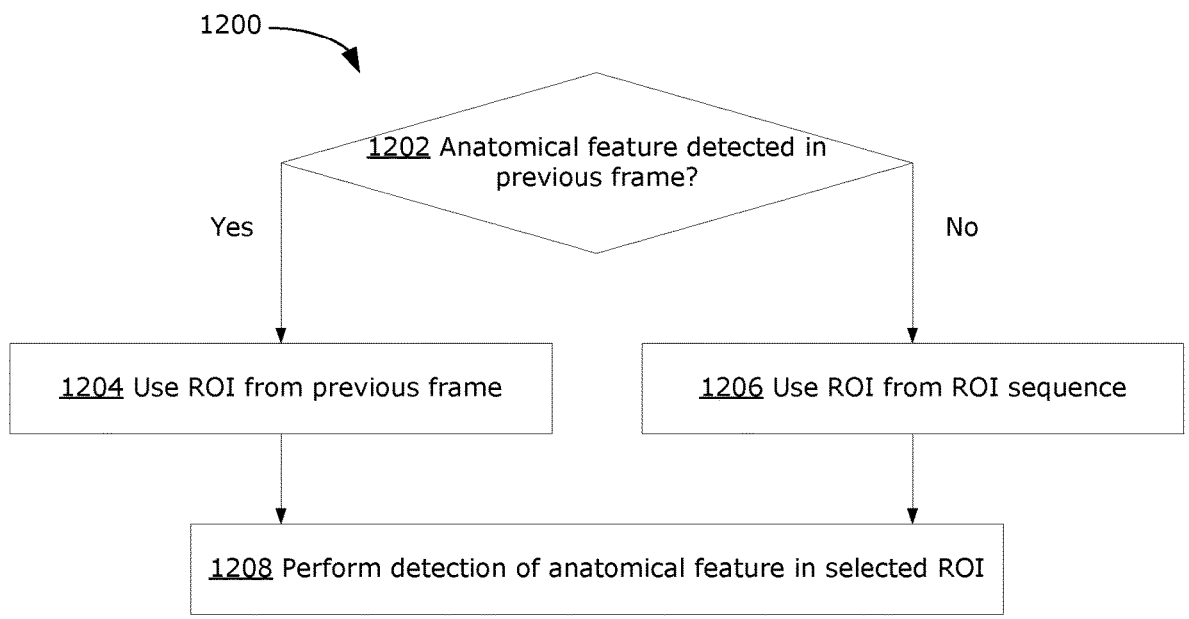
FIG. 12 is a flowchart illustrating an example method for performing detection using an adaptive ROI.

FIG. 12 is a flowchart illustrating an example method 1200 using an adaptive ROI for detecting the distinguishing anatomical feature in an input frame captured by the camera 102. The method 1200 may be used as part of the step 1108 described above. For example, the method 1200 may be implemented by the face detection and tracking subsystem 312. It should be understood that the method 1100 may be implemented using other techniques for the step 1108, and adaptive ROI may or may not be used.

At 1202, it is detected whether the anatomical feature was detected in a previous input frame captured by the camera 102. If so, then at 1204 the ROI used for detection of the anatomical feature (e.g., face) in the previous input frame captured by the camera 102 is selected to be used again in the current input frame captured by the camera 102. Generally, the ROI for detection of the anatomical feature should be smaller than the entire input frame captured by the camera 102, and may be a square shape (based on how the detection algorithm was trained or designed).

If the anatomical feature was not detected in a previous input frame captured by the camera 102 (or there is no previous input frame captured by the camera 102), then at 1206 a ROI is selected from a ROI sequence. If an ROI from the ROI sequence was used in the previous input frame captured by the camera 102, then the next ROI in the ROI sequence may be selected for use in the current input frame captured by the camera 102. A ROI sequence may be predefined (e.g., predefined in the face detection and tracking subsystem 312). The ROI sequence defines a sequence of different ROIs to be used to process sequential input frames captured by the camera 102. For example, if the ROI sequence is a sequence of eight different ROIs (e.g., having different locations and/or sizes), then each ROI in the sequence is selected in turn for performing detection of the anatomical feature in a sequence of eight input frames captured by the camera 102. The ROI sequence may then cycle back to the first ROI in the sequence.

Figure 13:
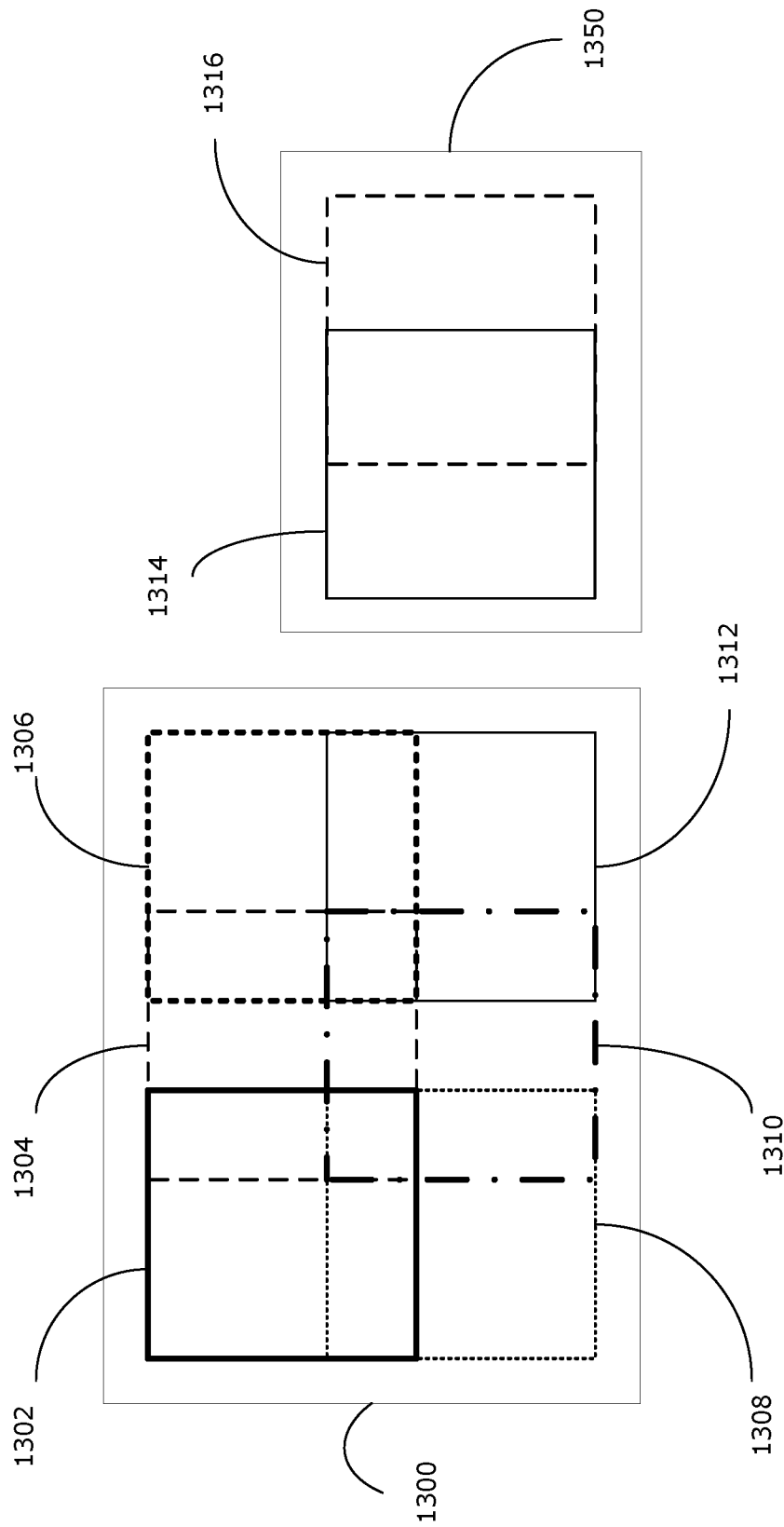
FIG. 13 shows an example ROI sequence that may be used in the method of FIG. 12.

FIG. 13 illustrates an example ROI sequence having eight different ROIs 1302, 1304, 1306, 1308, 1310, 1312, 1314, 1316. The eight ROIs 1302-1316 may be cycled through over a sequence of eight different input frames captured by the camera 102, and may be applied to input frames of different resolutions. For example, six ROIs 1302-1312 may be applied to the original resolution 1300 of the input frames captured by the camera 102, and may be designed to enable detection of smaller anatomical features (e.g., if the user 10 is farther away from the gesture-controlled device 100). Two ROIs 1314, 1316 may be applied to a downsized version 1350 of the input frames (having a version of the input frame having a lower resolution), and may be designed to enable detection of larger anatomical features (e.g., if the user 10 is closer to the gesture-controlled device 100). It may be useful to use a downsized version of the input frame for some ROIs 1314, 1316 to enable less computationally expensive processing of a larger area of the input frame.

It should be noted that the sequence of ROIs is cycled over a sequence of input frames captured by the camera 102, such that each input frame is processed using only one selected ROI (instead of processing the same input frame using two or more ROIs). Because input frames of a video captured by the camera 102 are typically captured at high frequency, the time difference between adjacent frames may be small enough that there should be no (or very little) information lost by processing a sequence of input frames captured by the camera 102 using a sequence of ROIs in this manner.

There may be different ROI sequences that are predefined (e.g., stored in the face detection and tracking subsystem 312). The ROI sequence that is used may be chosen by the user 10, or there may be a predefined order for cycling through the different ROI sequences (i.e., there may be a predefined sequence of ROI sequences to use). Further, although the example of FIG. 13 shows each ROI in the ROI sequence being used once in the sequence, in some examples the ROI sequence may be defined to use a given ROI two or more times within the ROI sequence. Other such variations may be possible.

At 1208, the selected ROI (either the ROI that was selected in the previous input frame captured by the camera 102 at step 1204, or the ROI selected from the ROI sequence at step 1206), the detection of the distinguishing anatomical feature is performed using the selected ROI.

The use of adaptive ROIs for performing detection of the distinguishing anatomical feature (e.g., face) may enable a reduction in computational cost and/or improved performance of the trained face detection and tracking subsystem 312.

In some examples, the adaptive ROI technique may be used to process every input frame captured by the camera 102, when hand gesture detection is activated (or when hand gesture detection is used by default). In other examples, the adaptive ROI technique may be used to process every N (where N>1) input frames captured by the camera 102.

As discussed previously, in some embodiments the hand detection and tracking subsystem 316 may output a hand image (i.e. a portion of the input frame corresponding to bounding box) that is to be used by the gesture recognition subsystem 322 for gesture recognition. In some embodiments, the gesture recognition subsystem 322 may be implemented using a model that is constructed using machine learning techniques. In some embodiments, the gesture recognition subsystem 322 includes a trained gesture classification neural network that is configured to performs hand gesture classification on hand images (e.g., a portion of an input frame that correspond to a bounding box output by hand detection and tracking subsystem 316).

Typically, the accuracy of a trained gesture classification neural network degrades as the hand image is cropped (e.g., when the bounding box has a large offset from the ground truth). An example of bounding box adjustment is described in U.S. patent application Ser. No. 16/355,665, entitled "ADAPTIVE IMAGE CROPPING FOR FACE RECOGNITION", filed Mar. 15, 2019, the entirety of which is hereby incorporated by reference. A similar approach is described here for bounding box adjustment to help improve gesture recognition.

Figure 14:
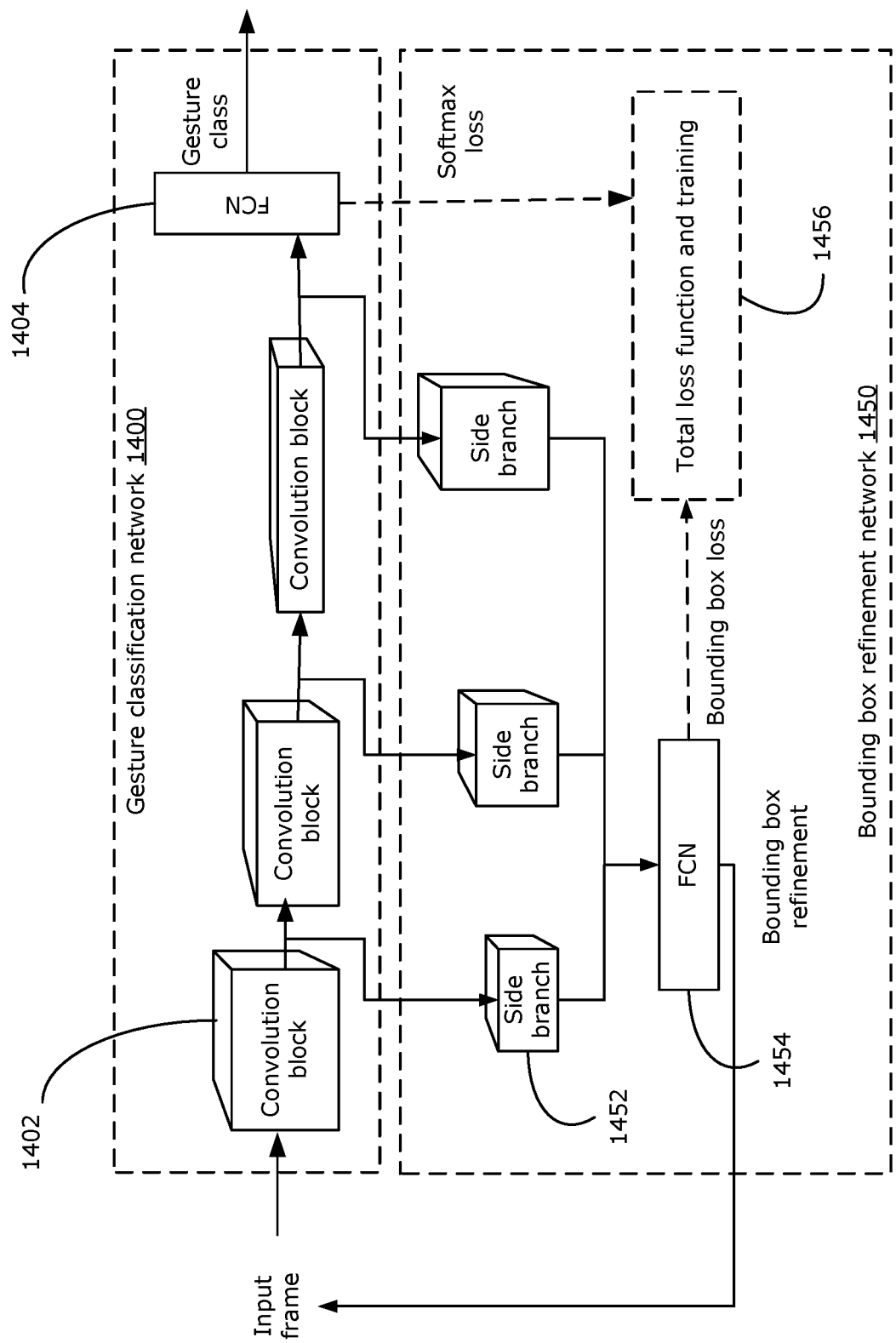
FIG. 14 is a block diagram illustrating an example joint network that may be used for gesture recognition.

FIG. 14 is a block diagram illustrating an example implementation of a gesture classification neural network that may be used for hand gesture recognition by the gesture recognition subsystem 322. The gesture classification network 1400 may be implemented together with side branches to a bounding box refinement network 1450. The gesture classification network 1400 performs gesture classification on a hand image (e.g., a portion of an input frame that corresponds to a bounding box output by hand detection and tracking subsystem 316), and the bounding box refinement network 1450 performs refinement of the bounding box that is used to generate the hand image that is used by the gesture classification neural network 1400.

A hand image is received as input data into the gesture classification neural network 1400. The hand image may be a cropped version of the input frame (e.g., a portion of the input frame that corresponds to the bounding box generated for the detected hand). In some embodiments, the input data may be a batch of hand images, such as for batch-based training of the networks 1400, 1450, or to enable gesture classification based on a sequence of frames. The gesture classification neural network 1400 includes a series of convolutional blocks 1402 (e.g., implemented using ResNet design). Three such convolutional blocks 1402 are shown for simplicity, but there may be greater or fewer convolutional blocks 1402 in the gesture classification network 1400. The series of convolutional blocks 1402 outputs to a gesture classification fully connected network (FCN) 1404 that outputs a determined gesture class. The gesture classification FCN 1404 receives, as input, the vector output from the last convolutional block 1402 in the series of convolutional blocks 1402. The gesture classification FCN 1404 uses feature embedding to determine a gesture class for the hand gesture recognized in the hand image, and outputs the determined gesture class as a label. The label is data or information that identified the determined gesture class for the recognized hand gesture. In some embodiments, the gesture classification FCN 1404 outputs a vector that contains probability distributions for possible gesture classes. That is, the output of the gesture classification network 1400 may be probabilities for different gesture classes, instead of one definitive determined gesture class. In some embodiments, the gesture classification FCN 1404 includes a softmax function in the last output layer, which serves to normalize the outputted probability distributions for possible gesture classes.

Each convolution block 1402 also outputs to a side branch 1452 that belongs to the bounding box refinement network 1450. Each side branch 1452 outputs to a bounding box refinement FCN 1454. Each side branch 1452 may independently include an optional max-pooling layer, an optional resizing layer, and a convolutional block. The output of the side branches 1452 are concatenated into a combined output vector, which may be flattened by a 1×1 convolutional block (not shown) before being inputted to the bounding box refinement FCN 1454. The output of the bounding box refinement FCN 1454 is information (e.g., in the form of coordinate information for the bounding box) that adjusts or refines the size and location of the bounding box used to crop the input frame to generate cropped version of the input frame (e.g. the hand image).

Training of the joint networks 1400, 1450 is now discussed. As described above, the gesture classification FCN 1404 may include a softmax layer. The gesture classification FCN 1404 may further calculate and output a cross-entropy loss, which may be thought of as a measure of the difference between the outputted probability distributions and the original probability distributions in the model. This cross-entropy loss may be used as a loss function for the softmax layer, and hence may also be referred to as the softmax loss. Similarly, a bounding box loss may be outputted from the bounding box refinement FCN 1454. The softmax loss and the bounding box loss may be combined for a total loss function, which may be used for training 1456 of the joint networks 1400, 1450. The softmax loss, bounding box loss and training 1456 using total loss function may be used only during training of the networks 1400, 1450, and may not be needed during inference.

During training of the networks 1400, 1450, training data samples may be generated with random cropped versions of the input frame (e.g., hand images) based around a ground truth hand bounding box.

Figure 15:
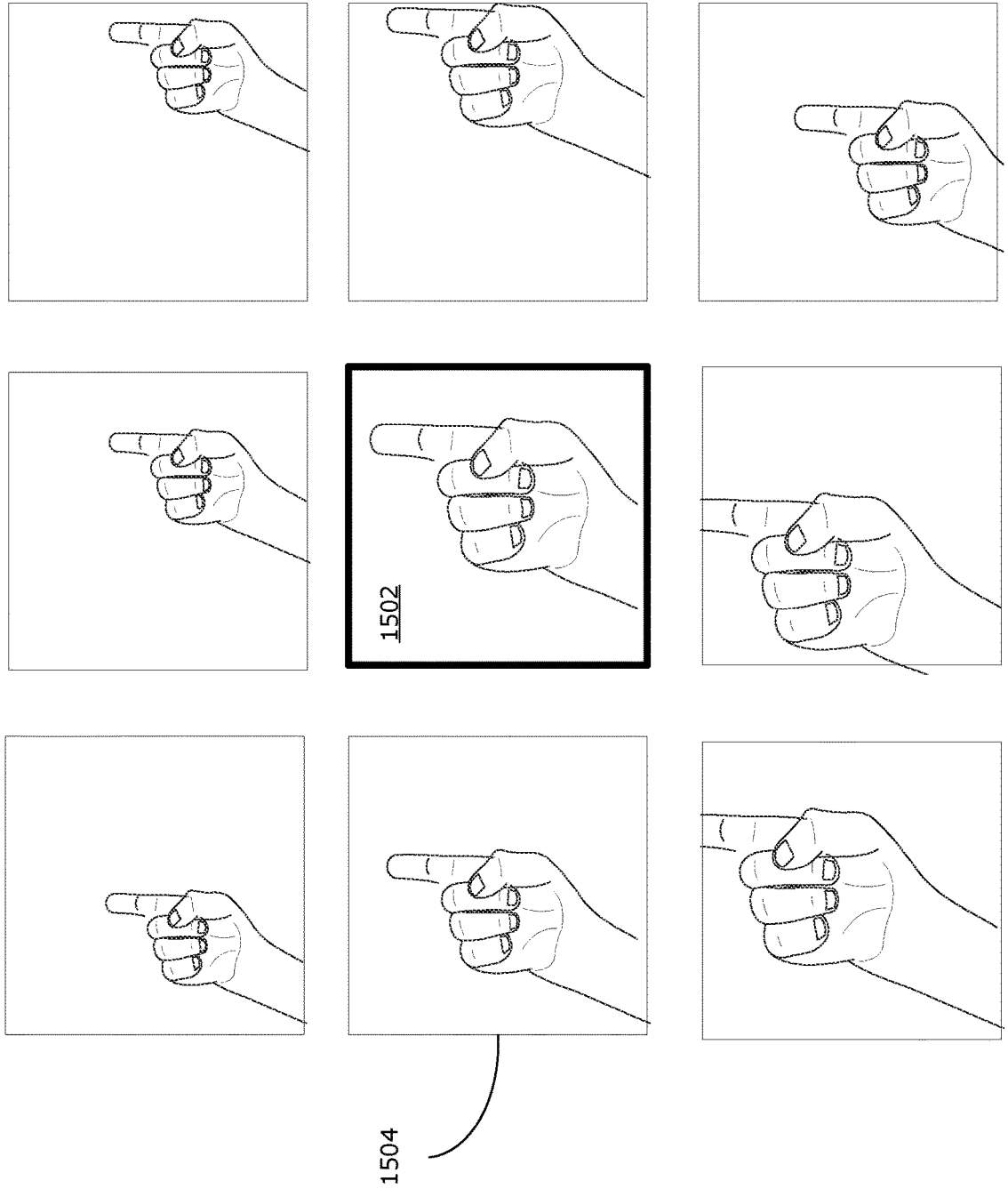
FIGS. 15 and 16 shows some example training data samples that may be used to train the joint network of FIG. 14.

Some examples are shown in FIG. 15, in which the ground truth 1502 defines the optimized bounding box for generating the cropped version of the input frame (e.g. the hand image), and other randomly cropped versions of the input frame (e.g. hand images) are generated as training data samples 1504. It should be noted that the training data samples 1504 may not only shift the position of the bounding box, but may also change the size of the bounding box (such that the hand in the hand image may appear larger or smaller). The bounding box offset of each training data sample 1504 relative to the ground truth 1502 is used as labels for training the bounding box refinement.

The joint networks 1400, 1450 are trained by minimizing the total loss function, which in this example is a linear combination of a classification loss function (the softmax loss) and the bounding box loss function. An example of the bounding box loss function is now discussed.

Figure 16:
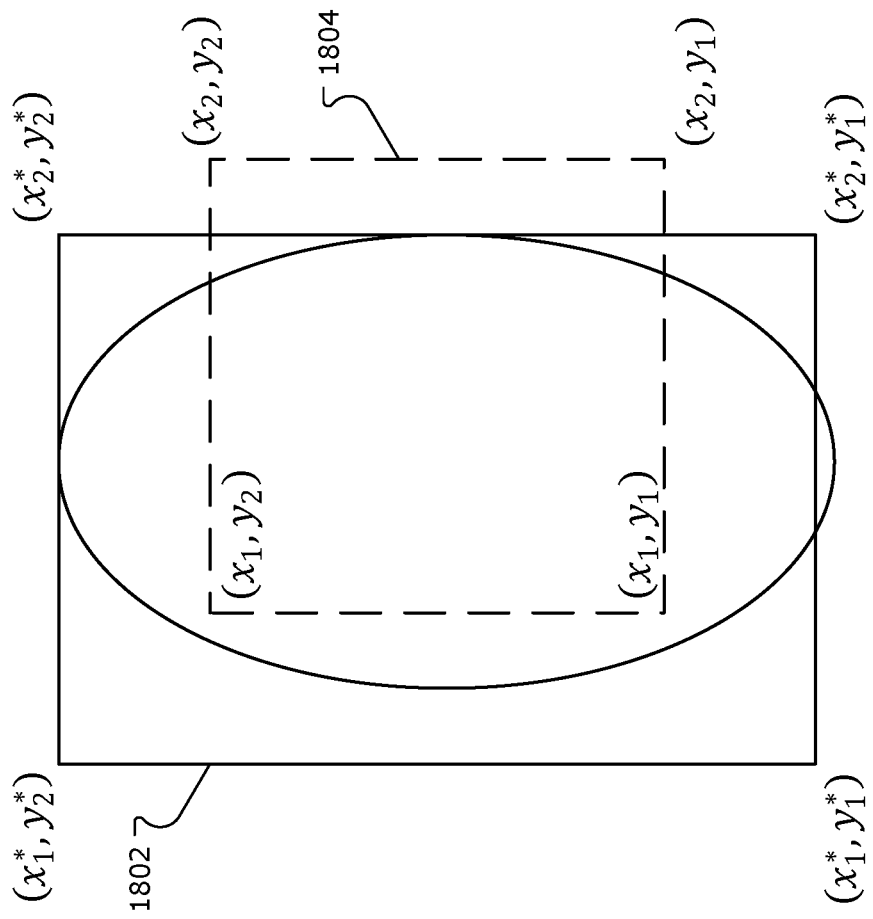

Consider the simplified example in FIG. 16, illustrating a ground truth bounding box 1802 defined around an object and a cropped training data sample bounding box 1804. Let $\{(x_1, y_1), (x_1, y_2), (x_2, y_1), (x_2, y_2)\}$ be the coordinates defining the location (in this example, the four corners) of the training data sample bounding box 1804, and let $\{(x_1^*, y_1^*), (x_1^*, y_2^*), (x_2^*, y_1^*), (x_2^*, y_2^*)\}$ be the coordinates defining the location of the corresponding ground truth 1802 bounding box. The bounding box refinement network 1450 estimates the relative rotation θ and the relative displacement $\{z_1, z_2, z_3, z_4\}$ between the training data sample bounding box 1804 and the ground truth bounding box 1802, where:

$$Z_1 = \frac{x_1^* - x_1}{x_2 - x_1}, Z_2 = \frac{x_2^* - x_2}{x_2 - x_1}, Z_3 = \frac{y_1^* - y_1}{y_2 - y_1}, Z_4 = \frac{y_2^* - y_2}{y_2 - y_1}$$

The bounding box loss function can be defined as:

$$L_{bc} = \lambda \left(\frac{\theta}{\pi}\right)^2 + \frac{1}{4} \sum_{k=1}^{4} (f_k - z_k)^2$$

where λ is a regularization parameter.

During inference, the bounding box used to crop an input frame to generate a hand image can be iteratively corrected until the offset predicted by the bounding box refinement network 1450 is close to zero. The final gesture classification score can be computed by combining all the individual gesture classification scores obtained at each iteration as follows:

$$\bar{s} = \sum_{m=1}^{M} \partial_m \cdot s_m$$

where $s_m$ is the classification score (e.g., softmax output) of the m-th iteration, and $\partial_m$ its corresponding weight (e.g. intersection over union (IoU)) of the m-th bounding box and the final refined bounding box.

During inference, iterative classification is performed on hand images using the gesture classification network 1400. In each iteration, the hand image input to the gesture classification network 1400 is obtained by cropping the previous input frame using a bounding box corrected by the outputted bounding box refinement parameters of the previous iteration.

Thus, the bounding box refinement network 1450 and the gesture classification network 1400 operate together to provide feedback for refining the bounding box generated for the hand image in the input frame captured by the camera 102, in order to help improve the performance of the gesture classification network 1400.

Figure 17:
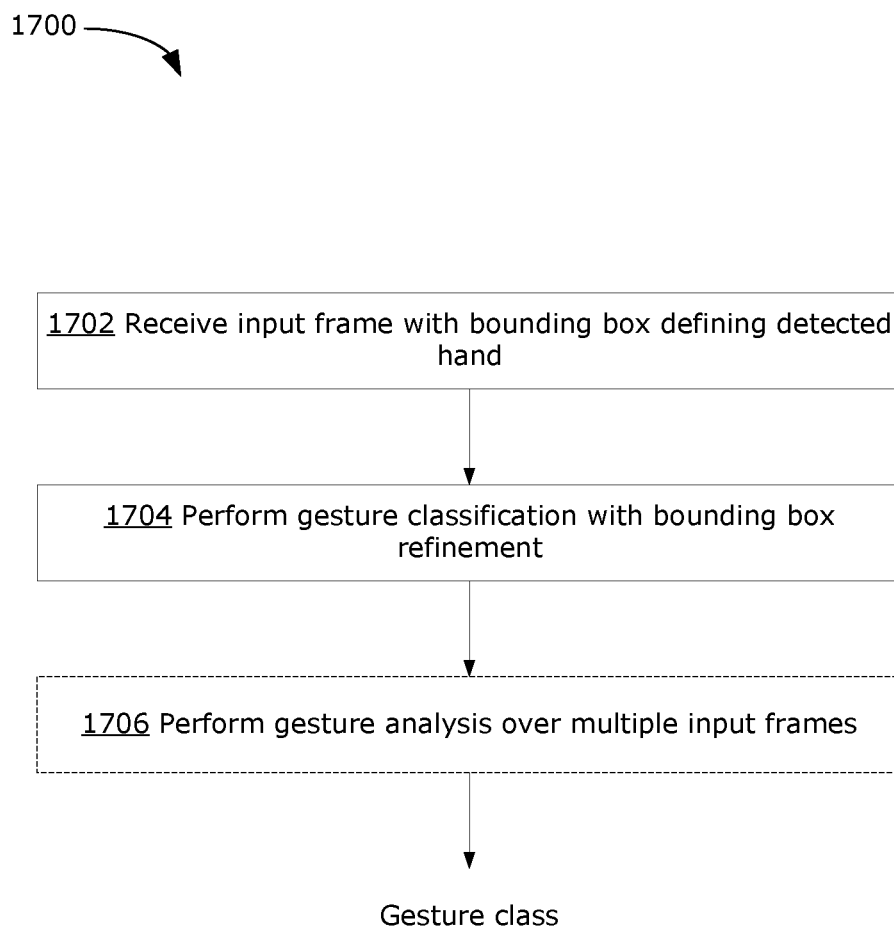
FIG. 17 is a flowchart illustrating an example method for gesture recognition.

FIG. 17 is a flowchart illustrating an example method 1700 using bounding box refinement (e.g., using the joint networks 1400, 1450 described above) for performing gesture recognition. The method 1700 may be used as part of the step 1118 described above. For example, the method 1700 may be implemented by the gesture recognition subsystem 322. It should be understood that the method 1100 may be implemented using other techniques for the step 1118, and bounding box refinement may or may not be used.

At 1702, the input frame captured by the camera 102 is received as well as a bounding box generated for the detected hand (e.g., outputted by the hand detection and tracking subsystem 316) and a cropped version of the input frame (e.g. a hand image) is generated by cropping the input frame using the generated bounding box.

At 1704, the gesture classification network with joint bounding box refinement network (as described above) may be used to perform hand gesture classification with bounding box refinement as described above.

Optionally, at 1706, hand gesture recognition may be performed over multiple input frames captured by the camera 102. For example, the gesture recognition subsystem 322 may store a buffer of previous input frames captured by the camera 102 and perform gesture recognition by considering the previous input frames captured by the camera 102.

A buffer (e.g., implemented in the adaptive gesture-sensing system 300) may be used to store a predetermined number of previous input frames captured by the camera 102. The number of previous input frames captured by the camera 102 that are stored in the buffer may be relatively small (e.g., 10-30 previous input frames), for more efficient use of memory resources. In some examples, the buffer may additionally or alternatively store the results of the gesture analysis performed on the small number of previous input frames captured by the camera 102.

For a single static gesture to be recognized, the gesture recognition subsystem 322 may require that the same label indicative of the gesture class be output a predefined minimum number of times (K) over a predefined number of previous input frames (N) captured by the camera 102, where K≥1 and K≤N. This requirement may help to improve detection accuracy and reduce false positives. In some examples, the same gesture class may need to be detected over K consecutive input frames captured by the camera 102 over N previous input frames captured by the camera 102. The predefined minimum K may be selected to be a relatively small number (e.g., 10) to enable better detection and still achieve near real-time gesture recognition. Static gestures that may be detected using this approach may include, for example, the mute gesture (e.g., for mute or unmute commands) or the open hand gesture (e.g., for play or pause commands). The N previous input frames may be stored in the buffer, and may be used as a sliding window for detecting gestures, to help reduce false positives.

A dynamic gesture may be recognized by the gesture recognition subsystem 322 based on a combination of two or more static gestures. For example, a complete dynamic gesture may be decoupled into different states, where transition between states is the result of detection of a static gesture. The gesture recognition subsystem 322 may implement a set of predefined state transition rules, for state-based recognition of dynamic gestures.

Figure 18:
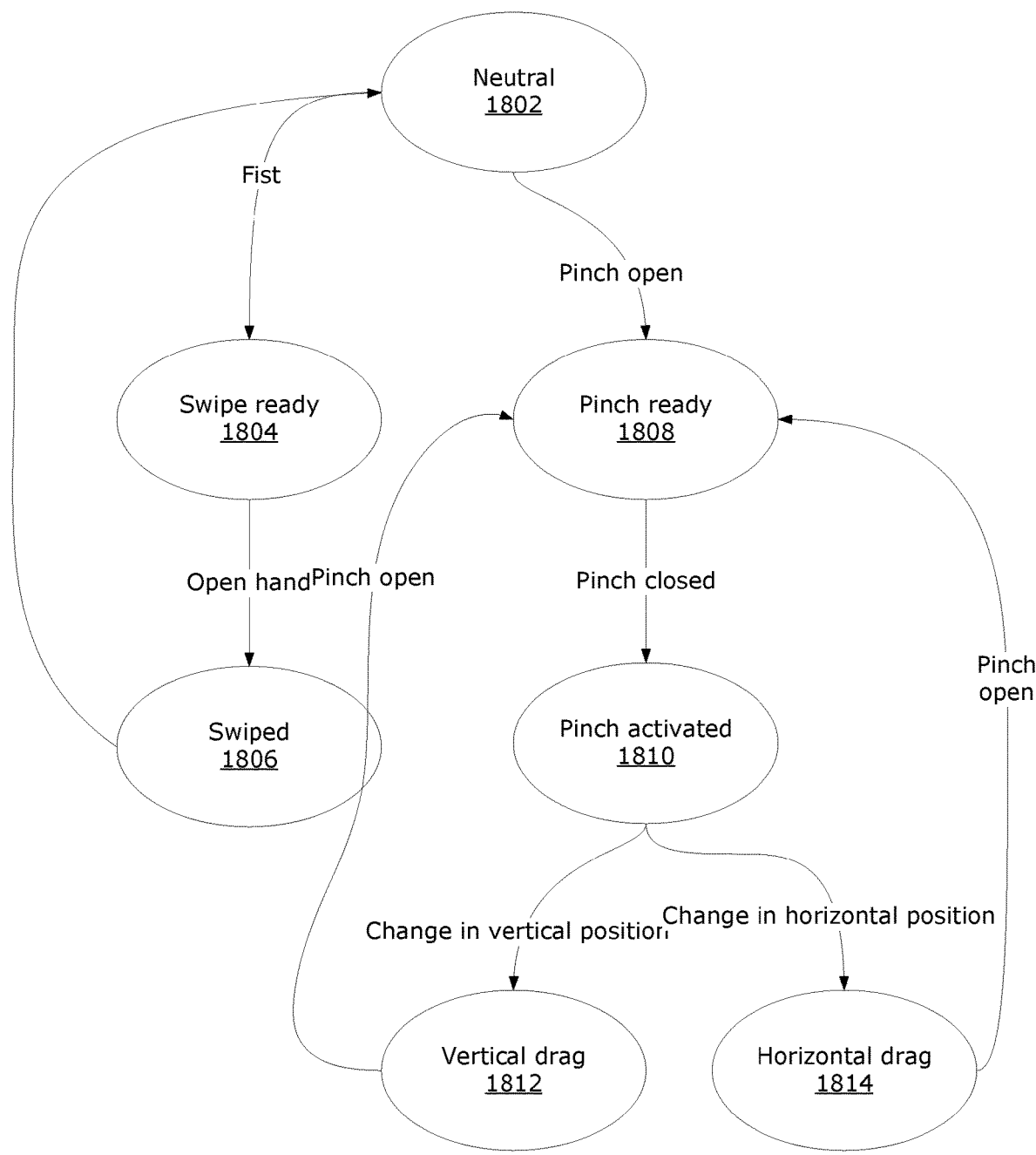
FIG. 18 is a state diagram illustrating an example of state-based gesture recognition.

FIG. 18 is a state diagram illustrating an example of state-based recognition of dynamic gestures, which may be implemented by the gesture recognition subsystem 322. The neutral state 1802 may be initial state by default when the gesture recognition subsystem 322 is first activated, or when a current valid hand gesture is not detected.

A swipe dynamic gesture may be detected when a first gesture is first detected to transition to the swipe ready state

1804, followed by detection of an open hand gesture to transition to the swiped state 1806. Upon reaching the swiped state 1806, the gesture recognition subsystem 322 recognizes the hand gesture as a dynamic swipe gesture. Thus, the recognition of the static fist gesture followed by the static open hand gesture (in proper order) results in the recognition of the dynamic swipe gesture. Further, a change in location between the detected fist gesture and the detected open hand gesture may be required to positively detect a dynamic swipe gesture (e.g., in order to distinguish the swipe gesture from another dynamic gesture that does not involve a change in location). A change in location of a detected hand gesture may be calculated based on a change in the coordinates of the bounding box generated for the detected hand. Upon reaching the swiped state 1806, the gesture recognition subsystem 322 may generate an output indicating the recognized hand gesture (e.g., gesture class label) and may further provide output indicating the change in location between the detection of the swipe ready state 1804 and the swiped state 1806.

A vertical or horizontal dynamic drag gesture may be detected as a combination of pinch open, pinch closed and pinch open static gestures. For example, from the neutral state 1802, a transition to a pinch ready state 1808 occurs after detection of the pinch open static gesture. From the pinch ready state 1808, detection of the pinch closed static gesture causes a transition to the pinch activated state 1810. From the pinch activated state 1810 and staying in the pinch closed static gesture, a change in vertical location (e.g., a change that is greater than a predefined threshold) causes a transition to the vertical drag state 1812. Similarly, from the pinch activated state 1810 and staying in the pinch closed static gesture, a change in horizontal location (e.g., a change that is greater than a predefined threshold) causes a transition to the horizontal drag state 1814). If the change in location is a combination of vertical and horizontal changes (e.g., a diagonal change in location), the change that is greater in magnitude may be used for determining the state transition. Alternatively, if the change in location is a combination of vertical and horizontal changes, there may not be a state transition recognized. Upon reaching the vertical drag state 1812 or the horizontal drag state 1814, the gesture recognition subsystem 322 may generate an output indicating the recognized hand gesture (e.g., gesture class label) and may further provide output indicating the change in vertical or horizontal location. For example, the gesture recognition subsystem 322 may calculate the distance (e.g., based on coordinates defined in the input frame) and output this value. The distance value may be used to map the dynamic drag gesture to a drag command input. From the vertical drag state 1812 or the horizontal drag state 1814, detection of the pinch open static gesture causes a transition to the pinch ready state 1808. Return to the pinch ready state 1808 may be recognized as the end of the dynamic drag gesture.

For dynamic gestures that involve a change in location, the gesture recognition subsystem 322 may implement predefined rules based on laws of physics and/or expected human motion, to further exclude possible false positives. For example, a predefined rule may be that a detected hand should not exhibit a change in location that is greater than a predefined threshold (e.g., a change of more than 100 pixels) between consecutive input frames.

Using state-based gesture recognition may be advantageous over motion-based gesture segmentation and recognition. For example, significantly higher processing resources may be required to detect and process gesture motion, compared to detecting static gestures. Further, state-based gesture recognition may be less prone to false positives.

In some embodiments, the system 300 may use an expanded virtual gesture-space to recognize valid hand gestures, along with an activation region in which hand gestures must be initiated in order to be translated to a command input. Hand gestures initiated inside the virtual gesture-space but outside of the activation region may be recognized as a valid hand gesture, but do not initiate actions by the gesture-controlled device 100 until the hand gesture is performed within the activation region.

The activation region may provide a way of distinguishing accidental from intentional hand gestures performed by the user 10. In some cases, the user 10 may perform a valid hand gesture outside the activation area. The gesture recognition subsystem 322 may detect, recognize and classify the hand gesture, but the system 300 in some embodiments may treat this hand gesture as ambiguous as to whether the user 10 actually wants to interact with the system or not. In embodiments using an activation region, the gesture recognition subsystem 322 may determine that the user 10 has performed a valid hand gesture or a sequence of hand valid gestures over a certain number of input frames outside the activation region. In response, the user feedback subsystem 362 may display activation region feedback, as described below with reference to FIG. 20C. The activation region feedback may, in some embodiments, include an image representing a human body and showing the activation region and the current hand position. The activation region feedback may display the distance and angular position of the user's hand with respect to the activation region and the hand gesture that the user 10 is performing. In some embodiments, the activation region feedback may include additional information, such as textual instructions, prompting the user to move the gesture within the activation region in order to initiate the corresponding action by the gesture-controlled device 100.

Figure 19A:
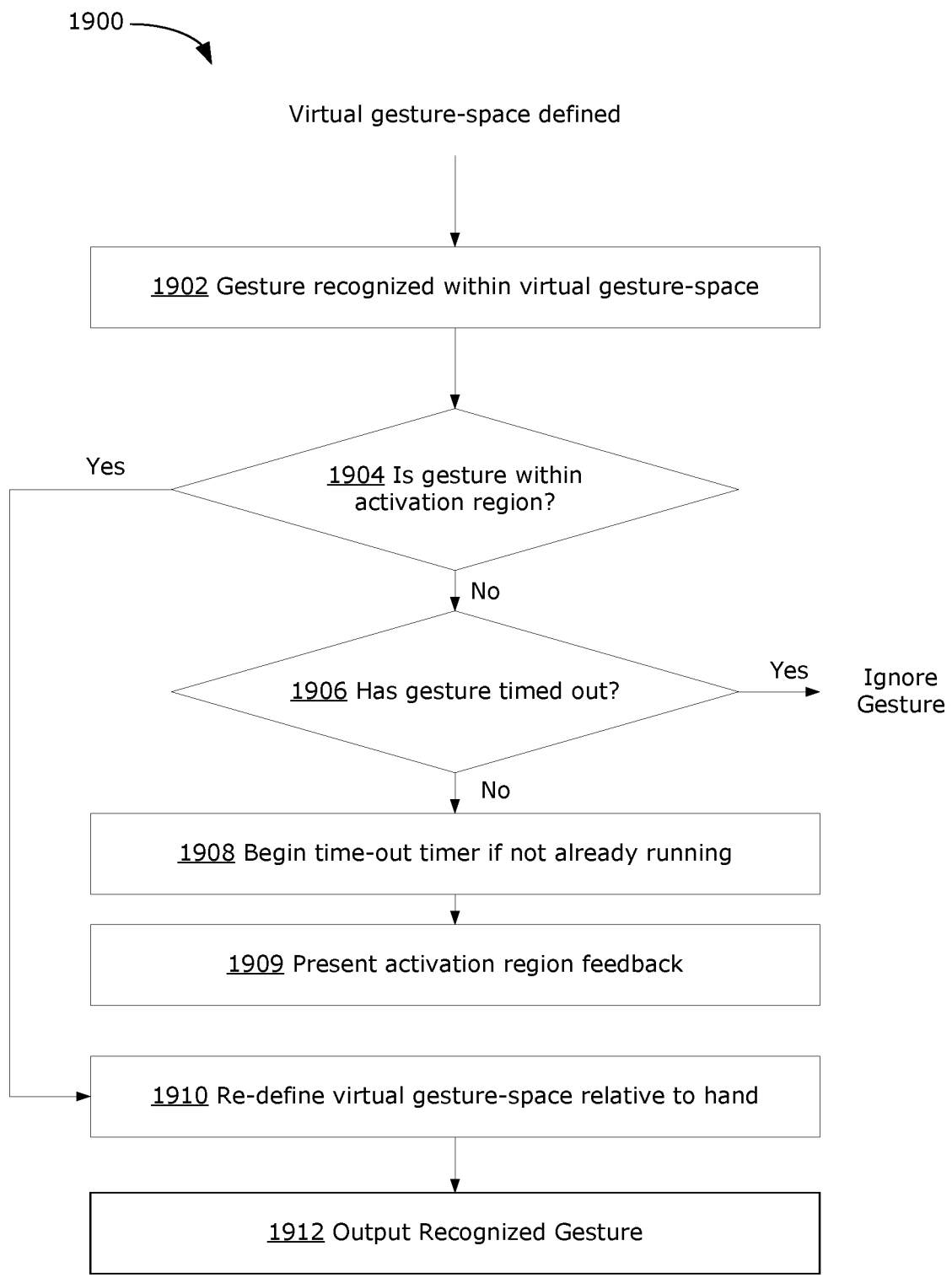
FIG. 19A is a flowchart illustrating a first example method for gesture control using an activation region.
Figure 19B:
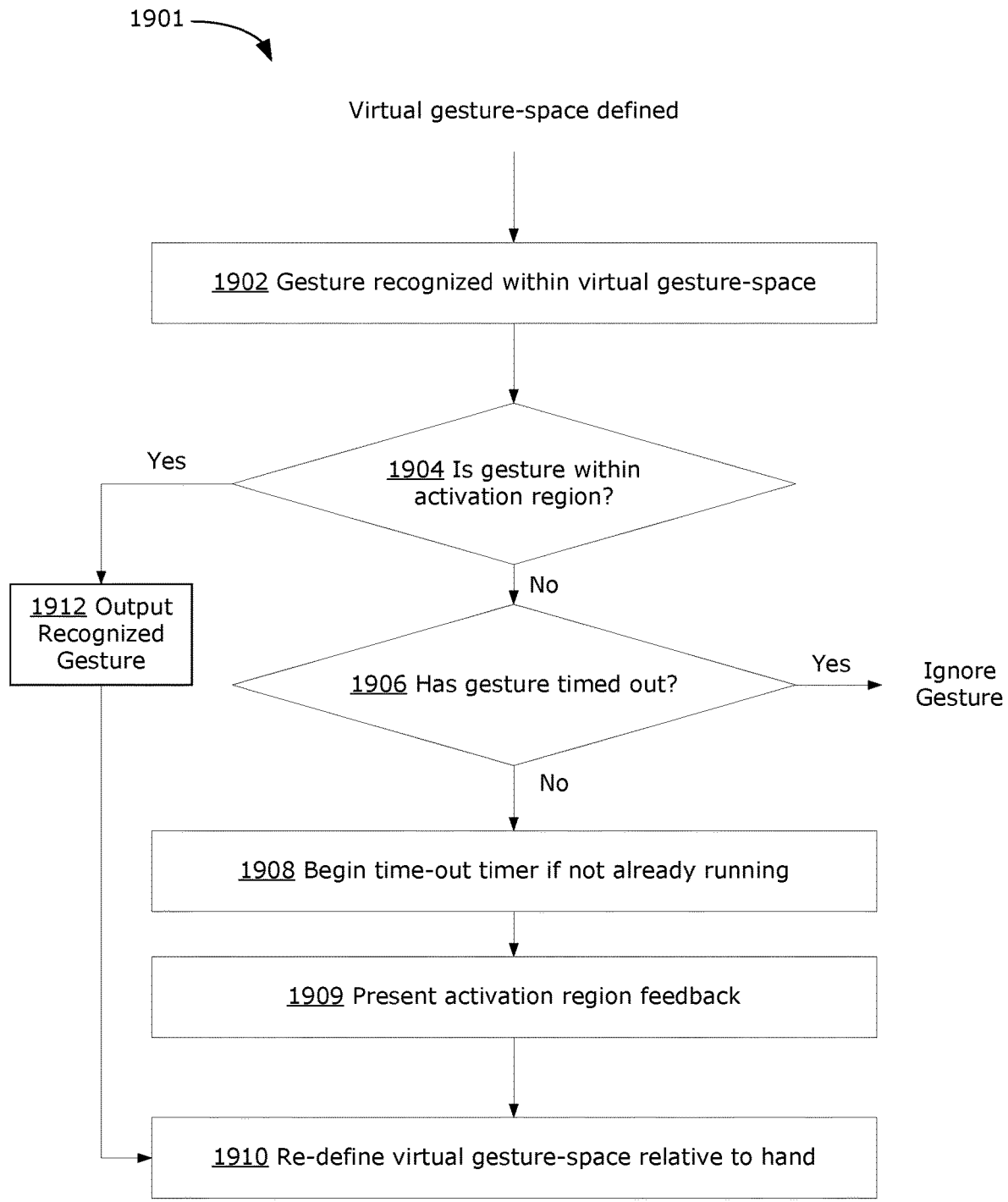
FIG. 19B is a flowchart illustrating a second example method for gesture control using an activation region.

FIG. 19A is a flowchart illustrating a first example method 1900 for gesture control of the gesture-controlled device 100 using an activation region. FIG. 19B is a flowchart illustrating a second example method 1901 for gesture control of the gesture-controlled device 100 using an activation region that constitutes a variant on method 1900. The various steps of methods 1900 and 1901 are described with reference to FIGS. 20A-C. FIG. 20A shows a simplified representation of a virtual gesture-space and activation region defined relative to a user. FIG. 20B shows a simplified representation of a virtual gesture-space, the bounding box generated for a detected hand, and activation region defined relative to the user of FIG. 20A. FIG. 20C shows an example activation region feedback screen shown on display 104 to prompt a user to move a hand gesture within the activation region.

Returning to FIG. 19A, the method 1900 starts after the virtual gesture-space has been defined (e.g., by the virtual gesture-space generation subsystem 314, at step 1114). In this embodiment, the virtual gesture-space is defined relative to the detected location of the user's head: FIG. 19B shows an example virtual gesture-space 1932 defined relative to the position of the user's head 1934. In some embodiments, the virtual gesture-space may be defined relative to another body part of the user, such as a hand that has been detected by the hand detection and tracking subsystem 316.

At step 1902, the user's hand is detected within the virtual gesture-space, and a hand gesture being performed by the hand is recognized by the gesture recognition subsystem 322. In FIG. 20A, the user's hand 1938 is shown performing an "open hand" gesture within the virtual gesture-space 1932.

At step 1904, the hand detection and tracking subsystem 316 determines whether the user's hand is performing the hand gesture within an activation region (AR). In FIG. 20A, the activation region 1936 is shown as being smaller than the virtual gesture-space 1932 and positioned relative to the user's head 1934. In other embodiments, the activation region may be sized or shaped differently, and it may be positioned relative to a different body part of the user.

If the hand gesture is determined to be within the activation region at step 1904, the method 1900 proceeds to step 1910. At step 1910, the virtual gesture-space is re-defined relative to the user's hand by the virtual gesture-space generation subsystem 314, as described above with reference to FIG. 9 (step 910 of method 900). In some examples, the re-defined virtual gesture-space may be centered on the hand, but larger in size than a hand bounding box defined by the dimensions of the hand. FIG. 20B shows an example re-defined virtual gesture space 1932 centered on the user's hand 1938, along with a hand bounding box 1940 with dimensions defined by the dimensions of the hand 1938. The re-defined virtual gesture space 1932 may be used by the hand detection and tracking subsystem 316. The re-defined virtual gesture space 1932 may be re-defined in each subsequent frame according to steps 1902, 1904, and 1910, thereby moving with the hand and tracking it even if it moves outside of the activation region. As long as the user is performing a recognized gesture, the re-defined virtual gesture space 1932 will move with the user's hand and allow the gestures of that hand to be recognized and translated to command inputs. At step 1912, the hand gesture is recognized and classified, with the resulting hand gesture class (e.g. label identifying the hand gesture class) being outputted for translation to a command input, as described above, e.g. with respect to method 1100 in FIG. 11A.

If the gesture is determined not to be within the activation region at step 1904, the method 1900 proceeds to step 1906.

At step 1906, a time-out timer is consulted to determine whether the hand gesture being performed outside of the activation zone has timed out by remaining outside of the activation zone for more than a predetermined period of time. If the gesture is determined at step 1906 to have timed out, then the hand gesture is ignored by the gesture recognition subsystem 322 until a reset condition is detected. In some examples, the reset condition may be that the gesture recognition subsystem 322 detects that the hand gesture is no longer being performed by the user's hand. Once the reset condition has been triggered, the hand gesture may once again be recognized by the gesture recognition subsystem 322 at step 1902.

If the gesture being performed outside of the activation zone is determined at step 1906 not to have timed out, the method 1900 proceeds to step 1908. At step 1908, the time-out timer is started if it is not already running.

At step 1909, activation region feedback is presented to the user by the user feedback subsystem 362. FIG. 20C shows an example activation region feedback screen 1950. Upon detection at step 1908 that the user is performing a gesture outside of the activation region, the activation region feedback screen 1950 is presented on the display 104 to provide feedback information to the user prompting the user to move the hand gesture within the activation region. The activation region feedback screen 1950 superimposes activation region feedback information 1954 over the other content being rendered on the display 104, in this case video content 1952. In this example, the activation region feedback information 1954 includes a stylized representation of the user's body 1960 showing the size, shape and position of the activation region 1958 relative to the user's body 1960. The activation region feedback information 1954 also includes a representation of the user's hand 1956 performing the hand gesture, showing the position of the hand 1956 relative to the activation region 1958, thereby prompting the user to move the hand performing the hand gesture within the activation region. In this example, the activation region feedback information 1954 also includes a text prompt prompting the user to move the hand gesture within the activation region, in this case the text "Move Hand Close".

FIG. 19B is a flowchart illustrating a second example method 1901 for gesture control of the gesture-controlled device 100 using an activation region. The steps are identical to those of method 1900, but are arranged differently relative to one another. Notably, if the gesture is determined to be within the activation region at step 1906, the method 1901 proceeds directly to steps 1912 to recognize and classify the hand gesture, followed by step 1910 to re-define the virtual gesture-space relative to the hand. Furthermore, in the branch following a determination at step 1908 that the gesture being performed outside of the activation region has not timed out, step 1910 (re-defining the virtual gesture-space) is performed following step 1909 (presenting activation region feedback). This means that, whereas method 1900 re-defines the virtual gesture-space relative to the hand only after the hand has been detected in the activation region (as seen in FIG. 20B), in method 1901 the virtual gesture-space is re-defined relative to the hand as soon as the hand is detected within the initial virtual gesture-space making a hand gesture. In a further method (not shown), the virtual gesture-space may be re-defined relative to the user's hand as soon as a hand is detected within the initial virtual gesture-space, regardless of whether a valid hand gesture is detected. This step could be considered to be the initial condition for either method 1900 or method 1901: the initial definition of the virtual gestures-space preceding step 1902 could be the virtual gesture-space defined relative to the user's hand in response to the hand being detected by the hand detection and tracking subsystem 316, as described above with reference to FIG. 9 (method 900, steps 908 to 910).

It will be appreciated that many of these steps can be performed in a different order without materially affecting how the methods 1900 or 1901 operate. For example, starting the time-out timer at step 1908 and presenting the activation feedback data at step 1909 may be performed in any order relative to each other.

Figure 21:
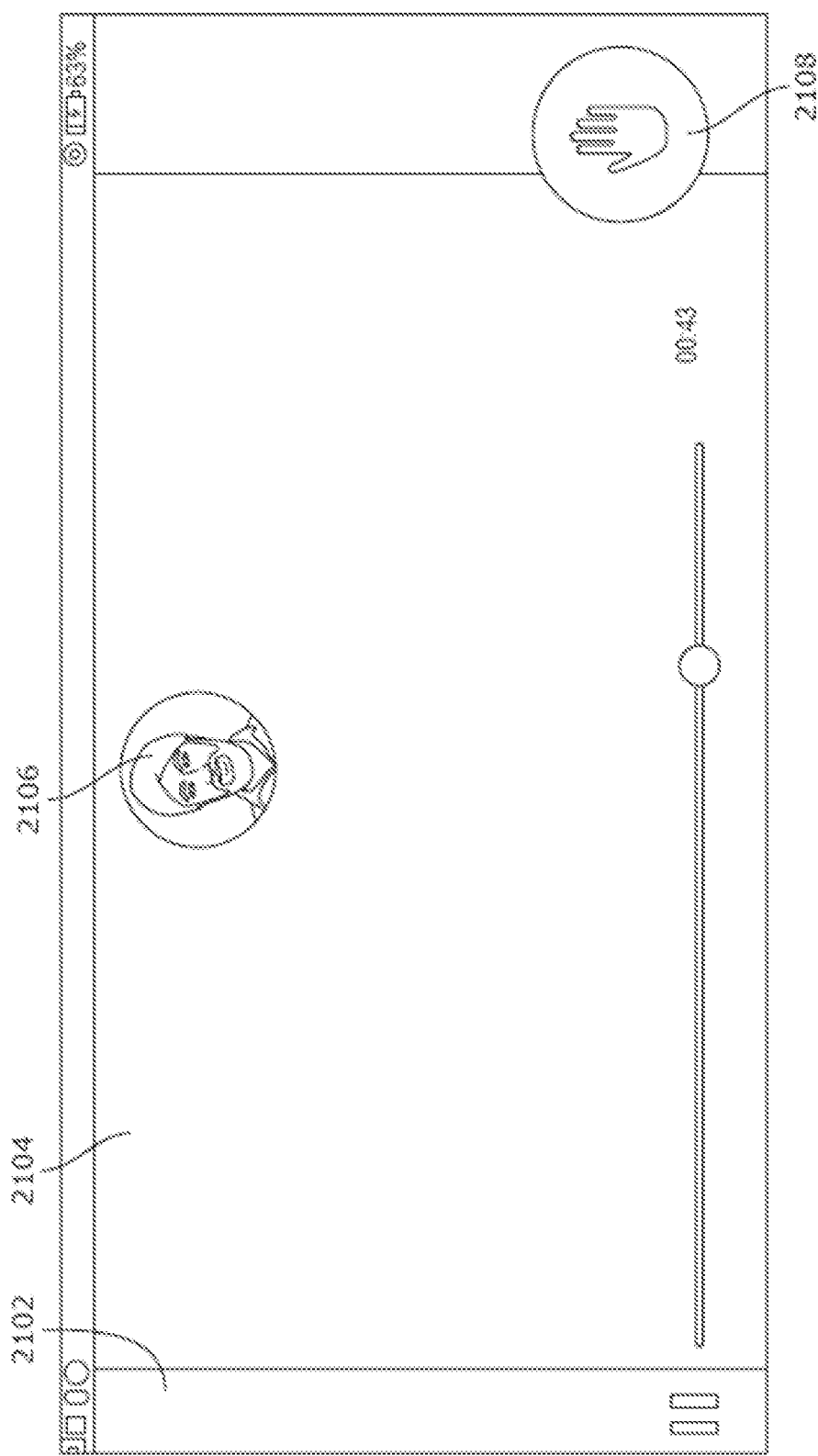
FIG. 21 is an example screen of a display of an example gesture-controlled device showing feedback indicating the current primary user in a multi-user environment.

FIG. 21 shows an example graphical user interface 2102 presenting feedback to users in a multi-user environment. The graphical user interface 2102 is rendered on display 104 such that it is visible to at least some users in a multi-user environment. In this example, the display 104 is being used to render video content 2104 in the graphical user interface 2102. When a valid hand gesture by a user is detected by the face detection and tracking subsystem 312, the virtual gesture-space generation subsystem 314, the hand detection and tracking subsystem 316, and/or the gesture recognition subsystem 322, and when the gesture has priority as determined by the priority ruleset 352, then the user feedback subsystem 362 presents feedback information indicating that the detected gesture has priority. In this embodiment, the feedback information comprises a "hand" icon 2108 indicating that a valid gesture is being performed and that the gesture has priority (i.e., if the gesture is completed the system 300 will initiate the corresponding action), as well as a "face" icon 2106 indicating the identity of the user making the gesture. In this embodiment, the face icon 2106 shows an image of the current primary user's face, either based on the current video frame captured by the camera 102, based on a different recent video frame captured by the camera 102, or based on previously-saved user face image data stored in the memory 208. Depending on the priority ruleset 352 used by the system 300, the primary user shown in the face icon 2106 may be identified based on being the first user in time (using a first-user-in-time ruleset), performing a gesture corresponding to a higher-priority action than any other hand gesture being performed (using an action-hierarchy ruleset), or by being the designated master user (using a designated-master-user ruleset). The feedback information thus indicates that the gesture currently being performed by the user shown in the face icon 2106 is valid and has priority over any other hand gestures currently being performed by other users.

In some embodiments, the feedback information could indicate two or more valid hand gestures being performed, for example if the adaptive gesture-sensing system 300 is using an action-hierarchy ruleset and the two valid input gestures being performed simultaneously do not conflict or can be aggregated. In such embodiments, the feedback information may include two or more face icons 2106 to indicate all users making simultaneous, valid hand gestures whose corresponding actions are non-conflicting.

In some embodiments, the face icon 2106 may be a stylized icon instead of an image of the primary user's face. The stylized icon may be set by user preferences, it may be a stylized representation of an image of the user's face captured by the camera 102, or it may be determined in some other way. In some embodiments, the position of the face icon 2106 and/or hand icon 2108 may be different from the example shown in FIG. 21: for example, the face icon 2106 may be shown near the left edge, right edge, or bottom edge of the display 104 instead of near the top edge, or the face icon 2106 may be shown in a horizontal position along the top edge or bottom edge based on the primary user's position within the FOV of the camera 102, either absolutely or relative to other users within the camera FOV.

Figure 22A:
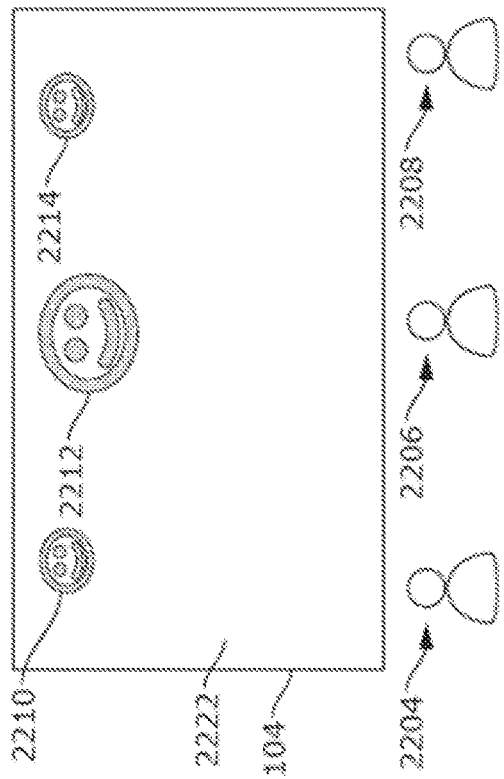
FIG. 22A is a schematic showing simplified example screens of a display of an example gesture-controlled device showing feedback indicating the current primary user in a multi-user environment before a gesture by the master user to designate a new master user.
Figure 22B:
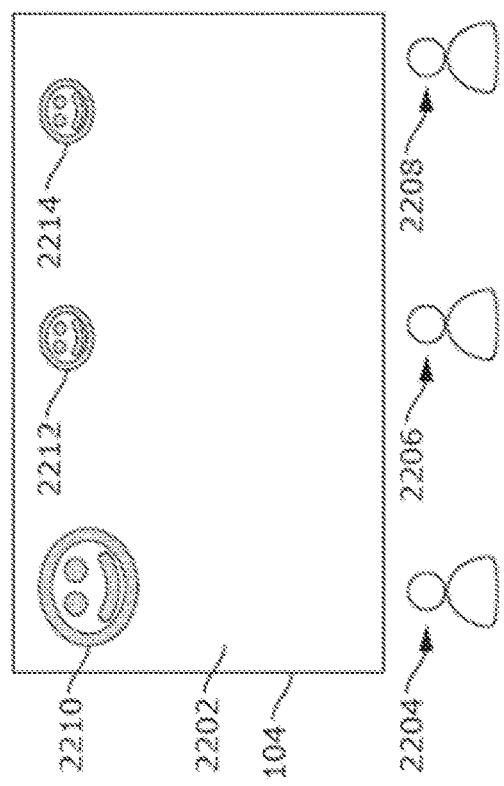
FIG. 22B is a schematic showing simplified example screens of a display of an example gesture-controlled device showing feedback indicating the current primary user in a multi-user environment after a gesture by the master user to designate a new master user.
Figure 22C:
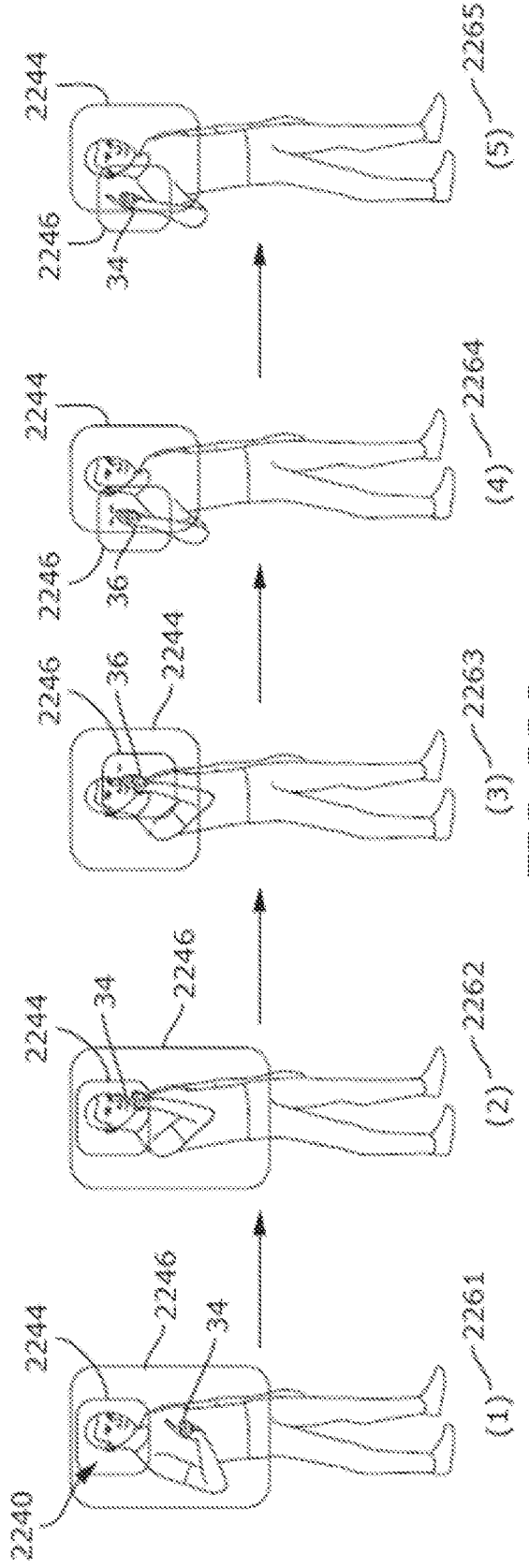
FIG. 22C is a simplified front view of several moments in time of a master user performing a gesture to designate a new master user.

FIG. 22A-C show an example method for designating a new master user according to the methods 1103 and 2240 described above with reference to FIG. 11C. FIG. 22A-B show example graphical user interfaces rendered on the display 104 during the performance of a dynamic hand gesture designating a new master user. FIG. 22C shows the performance of a dynamic hand gesture, which in the described example is a dynamic hand gesture for designating the new master user by a current master user. Collectively, FIGS. 22A-C provide an example of carrying out method 1103 as described above with reference to FIG. 11C.

FIG. 22A shows the display 104 being used to present a first graphical user interface 2202 that includes feedback information identifying the current master user. This first graphical user interface 2202 may be rendered on the display 104 by the user feedback subsystem 362 in response to the gesture recognition subsystem 322 recognizing a "new master user gesture" being performed by the current master user. The first graphical user interface 2202 includes feedback information in the form of a stylized representation of each user visible within the FOV of the camera 102. The master user, shown as first user 2204 standing in front of the display 104, is represented in the graphical user interface 2202 by a first user icon 2210, while a second user 2206 and third user 2208 are represented in the graphical user interface 2202 by a second user icon 2212 and third user icon 2214 respectively. In various embodiments, the first user icon 2210 may be distinguished from the second user icon 2212 and third user icon 2214 by various distinguishing features. For example, as shown in FIG. 22A, the first user icon 2210 is shown in a larger size than the second user icon 2212 and third user icon 2214. In some embodiments, the first user icon 2210 is shown in a different color than the second user icon 2212 and third user icon 2214, or having a different shape or style. The three user icons 2210, 2212, 2214 may in some embodiments contain information indicating or identifying their respective users, other than their relative positions on the graphical user interface 2202: they may, for example, be based on images of each user's face, like the example face icons 2106 described above with reference to FIG. 21.

FIG. 22B shows a second user graphical user interface 2222 that includes feedback information indicating the actual or pending designation of the second user 2206 as the new master user. Here, the second user icon 2212 is distinguished from the other user icons 2210, 2214 be one or more of the distinguishing features described above with reference to FIG. 22A.

When carrying out the method 1103 described above with reference to FIG. 11C, using a designated-master-user ruleset, the system 300 uses the priority ruleset 352 to designate a new master user in response to the dynamic hand gesture shown being performed by a current master user in FIG. 22C. FIG. 22C shows five steps 2261 through 2265 of a master user 2240 performing a dynamic hand gesture to designate a new master user. While the dynamic hand gesture performed in FIG. 22C is provided as an example of a dynamic hand gesture used to designate a new master user, it will be appreciated that the dynamic hand gesture described and illustrated could be used in some embodiments to perform other control commands. The illustrated dynamic hand gesture consists of the following sequences of hand gestures: pinch-open; pinch closed; move hand left or right; pinch-closed; pinch-open. This dynamic hand gesture, or variations thereon (such as a variant that has the user move his or her hand up or down instead of left or right) could be used in some embodiments to change a variable over a range of values, such as changing audio volume up or down, or selecting from a range of content sources (such as channels or video files).

At step 2261, the master user 2240 performs a pinch open gesture 34 with his or her hand. The pinch open gesture 34 is detected by the hand detection and tracking subsystem 316 because it is performed within the virtual gesture-space 2246 for the master user, shown as a bounding box proximal to the master user's face as detected by the face detection and tracking subsystem 312. However, the pinch open gesture 34 is performed outside of an activation region 2244 shown as a smaller bounding box proximal to the master user's face. Accordingly, while the pinch open gesture 34 is detected at step 2261 by the hand detection and tracking subsystem 316 and recognized by the gesture recognition subsystem 322, it may not be translated to a command input until it is performed within the activation region 2244, as describe above with regard to methods 1900 and 1901. In some embodiments, the pinch open gesture 34 must be moved to the activation region 2244 within a predetermined period of time, or the gesture will time out and will be ignored until a reset condition is satisfied, also as described above with regard to methods 1900 and 1901.

At step 2262, the master user's hand performing the pinch open gesture 34 is moved into the activation region 2244.

The pinch open gesture is now outputted and translated to a command input by the gesture recognition subsystem 322.

At step 2263, the master user's hand performs a pinch closed gesture 36 within the activation region 2244, which is recognized by the gesture recognition subsystem 322. In this embodiment, performing a pinch open-to-pinch closed gesture within the activation region 2244 constitutes a "new master user gesture". In response, the hand detection and tracking subsystem 316 re-defines the virtual gesture-space 2246 relative to the hand of the master user 2240. This re-defined virtual gesture-space 2246 is tracked and monitored for further hand gestures by the hand detection and tracking subsystem 316 and the gesture recognition subsystem 322. The pinch-open-to-pinch-closed dynamic gesture is recognized as a new master user gesture, initiating an action to designate a new master user.

The user feedback subsystem 362 presents new master user selection information on the display 104, such as the first user feedback screen 2202 of FIG. 22A. The master user 2240 corresponds to the first user 2204 of FIG. 22A. The first user icon 2210 is shown on the screen 2202, indicating the first user 2204 as the master user 2240. The second user icon 2212 and third user icon 2214 constitute options for designating a new master user.

At step 2264, the master user 2240 moves his or her hand to his or her right (i.e. toward the left side of FIG. 22C), relative to its starting position within the activation region 2244. The pinch closed gesture 36 is maintained during this movement. In response to this movement to the right, the user feedback subsystem 362 may display feedback information such as the second user feedback screen 2222 of FIG. 22B, showing that the master user 2240 has tentatively designated the second user (i.e. the next user to the right) as the new master user.

However, this new designation is not finalized until the master user 2240 completes the dynamic gesture by performing a pinch open gesture 34. As long as the master user 2240 maintains the pinch closed gesture 36, he or she may continue to move his or her hand to the left or right (and in some embodiments, up or down) to change the tentative selection of an option for designating a new master user to highlight or identify another user corresponding to a different user icon on the display 104.

At step 2265, the master user 2240 performs a pinch open gesture 34. At this stage, whichever user is currently designated as the new master user based on the selected user icon on the display 104 is designated as the new master user.

The steps shown in FIG. 22C are consistent with method 1900 for gesture control using an activation region. Specifically, method 1900 re-defines the virtual gesture-space 2246 relative to the user's hand only after the user moves the hand within the activation region 2244. It will be appreciated that alternative methods for gesture control using an activation region could be used instead, such as method 1901, which re-defines the virtual gesture-space 2246 relative to the user's hand as soon as the user's hand is detected within the initial virtual gesture-space 2246. If method 1901 were substituted for method 1900 in the steps shown in FIG. 22C, the only difference would be at steps 2261 and 2262, in which the bounding box for the virtual gesture-space 2246 would be defined relative to the user's hand as it is in steps 2263 through 2265.

In various examples, the present disclosure describes systems and methods to help improve accuracy and efficiency for detecting and recognizing hand gestures. The present disclosure may be useful for detecting and recognizing hand gestures in a complex, multi-user environment and/or for long-distance detection of hand gestures.

Using one or more of the methods described above (e.g., the adaptive ROI technique, the bounding box refinement joint network, the virtual gesture-space, the multi-user priority ruleset, the activation region) may enable more robust detection and recognition of hand gestures, even in complex real-life scenarios. The improved accuracy of gesture detection may enable more efficient processing of captured input frames. In some examples, input frames may be processed at a frequency that is lower than the rate of image capture. For example, instead of processing every input frame, every N (where N>1) frames is processed for face (or other distinguishing anatomical feature) and hand detection and tracking. N may be a parameter that is user-selected, may be preprogrammed, or may be automatically selected by the gesture-controlled device 100 (e.g., N may be 1 when images are captured at a rate below a predefined threshold; N may be 2 or higher when images are captured above the predefined threshold; N may be 1 when image quality is poor or low resolution; N may be 2 or higher when image resolution is high). By processing every N (N>1) frames, gesture detection and recognition may still be performed with good accuracy at near real-time, and the processing resources required from the gesture-controlled device may be decreased.

The present disclosure describes example implementations using neural networks for face and hand detection. An example joint neural network is described that enable refinement of a hand bounding box, to help improve accuracy of gesture classification and recognition.

In some examples, a virtual gesture-space is described, which may be defined based on a detected human face (or other distinguishing anatomical feature). By using the defined virtual gesture-space for detection of a hand, more accurate and/or efficient detection of hand gestures may be achieved. In some embodiments, the virtual gesture-space may be further defined with subspaces where hand gestures in a particular subspace may be mapped to mouse inputs. Thus, the virtual gesture-space may be used as a virtual mouse.

Although examples have been described in the context of a gesture-controlled device having a display and a camera (such as a smart TV, a videoconferencing system, a VR or AR system, a smartphone or a tablet), the present disclosure may be relevant to other gesture-controlled devices that may or may not include a display and/or camera. For example, the present disclosure may be relevant to smart speakers, smart appliances, Internet of things (IoT) devices, dashboard devices (e.g., installed in a vehicle) or devices having low computational resource. The gesture-controlled devices may have embedded and/or external cameras and/or displays.

Examples described herein may be applicable to augmented reality (AR), virtual reality (VR) and/or video gaming applications.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for multi-user gesture control of a gesture-controlled device, the method comprising:
   receiving a first frame of a set of frames of a video captured by a camera of the gesture-controlled device;
   processing at least a portion of the first frame to detect a distinguishing anatomical feature of a first user visible at a first location in the first frame;
   processing at least a portion of the first frame to detect a distinguishing anatomical feature of a second user visible at a second location in the first frame;
   defining a first virtual gesture-space corresponding to a first region of the first frame proximal to the first location;
   defining a second virtual gesture space corresponding to a second region of the first frame proximal to the second location;
   processing the first region of the first frame and other frames of the set of frames using a gesture recognition subsystem to recognize a valid hand gesture performed by the first user in the first virtual gesture-space corresponding to the first region; and
   processing the second region of the frame and other frames of the set of frames using the gesture recognition subsystem to recognize a valid hand gesture performed by the second user in the second virtual gesture space corresponding to the second region; and
   identifying one of the first user and the second user as a primary user of the gesture controlled device based on a priority ruleset.

2. The method of claim 1, wherein identifying comprises:
   identifying the first user as the primary user when the valid hand gesture of the first user is recognized prior to the valid hand gesture of the second user being recognized; and
   identifying the second user as the primary user when the valid hand gesture performed by the second user is recognized prior to the valid hand gesture of the first user being recognized.

3. The method of claim 1, further comprising:
   providing feedback information to an output device of the gesture-controlled device for outputting by the output device, the feedback information indicating which one on the first user and the second user is the primary user.

4. The method of claim 3, wherein the output device is a display screen of the gesture-controlled device and wherein outputting the feedback information by the output device comprises displaying a visual indication of which one of the first user and the second user is the primary user.

5. The method of claim 3, wherein the output device is a speaker of the gesture-controlled device and wherein outputting the feedback information by the output device comprises outputting an audio indication of which one of the first user and the second user is the primary user.

6. The method of claim 1, further comprising:
   receiving a second set of frames of the video;
   when the first user is identified as the primary user:
      processing, using the gesture recognition subsystem, each frame of the second set of frames in an area surrounding a location of a hand of the recognized valid hand gesture performed by the first user to recognize an other hand gesture performed by the first user; and
      initiating an action of the gesture-controlled device associated with the other hand gesture performed by the first user; and
   when the second user is identified as the primary user:
      processing, using the gesture recognition subsystem, each frame of the second set of frames in an area surrounding a location of a hand of the recognized valid hand gesture performed by the second user to recognize an other hand gesture performed by the second user; and
      initiating an action of the gesture-controlled device associated with the other hand gesture performed by the second user.

7. The method of claim 6, wherein initiating an action of the gesture-controlled device associated with the recognized other hand gesture performed by the first user comprises initiating an action to change the primary user of the gesture-controlled device to the second user.

8. The method of claim 6, wherein, prior to initiating an action of the gesture-controlled device associated with the recognized other hand gesture performed by the first user, providing further feedback information to a display screen of the gesture-controlled device for rendering on the display screen, the feedback information indicating the other hand gesture performed by the first user.

9. The method of claim 6 wherein, prior to initiating an action of the gesture-controlled device associated with the recognized other hand gesture performed by the second user, providing feedback information to a display screen of the gesture-controlled device, the feedback information indicating which recognized other hand gesture was performed by the second user.

10. The method of claim 1, wherein the distinguishing anatomical feature of the first user is a face of the first user and the distinguishing anatomical feature of the second user is a face of the second user.

11. The method of claim 1, wherein defining a first virtual gesture-space corresponding to a first region of the first frame proximal to the first location comprises:

determining a gaze of an eye of the first user; and in response to determining that the gaze of the eye of the first user indicates that the first user is looking at a display screen of the gesture-controlled device, defining the first virtual gesture-space corresponding to the first region of the first frame proximal to the first location.

12. The method of claim 11, wherein defining a second virtual gesture-space corresponding to a second region of the first frame proximal to the second location comprises:

determining a gaze of an eye of the second user; and in response to determining that the gaze of the eye of the second user indicates that the second user is looking at a display screen of the gesture-controlled device, defining the second virtual gesture-space corresponding to the second region of the first frame proximal to the second location.

13. The method of claim 1, wherein defining a first virtual gesture-space corresponding to a first region of the first frame proximal to the first location comprises:

determining an orientation and pose of a head of the first user; and in response to determining that the orientation and pose of the head of the first user indicates that the first user is looking at a display screen of the gesture-controlled device, defining the first virtual gesture-space corresponding to the first region of the first frame proximal to the first location.

14. The method of claim 13, wherein defining a second virtual gesture-space corresponding to a second region of the first frame proximal to the second location comprises:

determining an orientation and pose of a head of the second user; and in response to determining that the orientation and pose of the head of the second user indicates that the second user is looking at a display screen of the gesture-controlled device, defining the second virtual gesture-space corresponding to the second region of the first frame proximal to the second location.

15. The method of claim 1, the priority ruleset assigns a ranking to the first user and second user and wherein identifying comprises:

identifying the first user as the primary user when the first user is a highest ranked user based on the priority ruleset; and identifying the second user as the primary user when the second user is the highest ranked user.

16. The method of claim 15, the priority ruleset is a temporal ruleset which assigns a ranking to the first user and the second user based on an order of detection of the distinguishing anatomical features of the first and second user in the first frame.

17. The method of claim 1, wherein the priority ruleset is a spatial ruleset which assigns a ranking to the first user and the second user based on a size of the detected distinguishing anatomical feature of the first user and the second user.

18. The method of claim 1, wherein the priority ruleset is a spatial ruleset which assigns a ranking to the first user and the second user based on a distance of the first and second users from a center of a display screen of the gesture-controlled device.

19. A gesture-controlled device comprising:
a processor;
a memory storing instructions which, when executed by the processor cause the gesture-controlled device to:

receive a first frame of a set of frames of a video captured by a camera of the gesture-controlled device;

process at least a portion of the first frame to detect a distinguishing anatomical feature of first user visible at a first location in the first frame and associate the detected distinguishing anatomical feature with a first user of the gesture-controlled system;

process at least a portion of the first frame to detect a distinguishing anatomical feature of a second user visible at a second location in the first frame and associate the detected distinguishing anatomical feature with a second user of the gesture-controlled system;

define a first virtual gesture-space corresponding to a first region of the first frame proximal to the first location;

define a second virtual gesture space corresponding to a second region of the first frame proximal to the second location;

process the first region of the first frame and other frames of the set of frames using a gesture recognition subsystem to recognize a valid hand gesture performed by the first user in the first virtual gesture-space corresponding to the first region; and process the second region of the frame and other frames of the set of frames using the gesture recognition subsystem to recognize a valid hand gesture performed by the second user in the second virtual gesture space corresponding to the second region; and identify one of the first user and the second user as a primary user of the gesture controlled device based on a priority ruleset.

20. A non-transitory computer-readable medium instructions which, when executed by the processor cause the gesture-controlled device to receive a first frame of a set of frames of a video captured by a camera of the gesture-controlled device;

process at least a portion of the first frame to detect a distinguishing anatomical feature of first user visible at a first location in the first frame and associate the detected distinguishing anatomical feature with a first user of the gesture-controlled system;

process at least a portion of the first frame to detect a distinguishing anatomical feature of a second user visible at a second location in the first frame and associate the detected distinguishing anatomical feature with a second user of the gesture-controlled system;

define a first virtual gesture-space corresponding to a first region of the first frame proximal to the first location;

define a second virtual gesture space corresponding to a second region of the first frame proximal to the second location;

process the first region of the first frame and other frames of the set of frames using a gesture recognition subsystem to recognize a valid hand gesture performed by the first user in the first virtual gesture-space corresponding to the first region; and process the second region of the frame and other frames of the set of frames using the gesture recognition subsystem to recognize a valid hand gesture performed by the second user in the second virtual gesture space corresponding to the second region; and identify one of the first user and the second user as a primary user of the gesture controlled device based on a priority ruleset.

* * * * *